(12) United States Patent
Ouyang et al.

(10) Patent No.: US 10,548,032 B2
(45) Date of Patent: Jan. 28, 2020

(54) NETWORK ANOMALY DETECTION AND NETWORK PERFORMANCE STATUS DETERMINATION

(71) Applicant: Verizon Patent and Licensing Inc., Arlington, VA (US)

(72) Inventors: Ye Ouyang, Piscataway, NJ (US); Le Su, Edison, NJ (US); Krishna Pichumani Iyer, Basking Ridge, NJ (US); Christopher M. Schmidt, Branchburg, NJ (US); Wenyuan Lu, Raritan, NJ (US); Shaun Robert Pola, Austin, TX (US); Maulik Shah, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 15/880,855

(22) Filed: Jan. 26, 2018

(65) Prior Publication Data
US 2019/0239101 A1    Aug. 1, 2019

(51) Int. Cl.
| H04W 24/08 | (2009.01) |
| H04W 24/04 | (2009.01) |
| G06N 3/08 | (2006.01) |
| G06N 3/04 | (2006.01) |
| H04W 84/04 | (2009.01) |

(52) U.S. Cl.
CPC .......... *H04W 24/04* (2013.01); *G06N 3/0454* (2013.01); *G06N 3/084* (2013.01); *H04W 24/08* (2013.01); *H04W 84/042* (2013.01)

(58) Field of Classification Search
CPC . H04L 41/147; H04L 41/5009; H04L 41/142; H04L 12/26; H04L 43/022; H04L 47/127; H04L 43/0864; H04L 69/16; H04L 69/22; G06F 15/173
See application file for complete search history.

(56) References Cited

U.S. PATENT DOCUMENTS

| 10,069,691 | B2 * | 9/2018 | Hu ........................ H04L 41/147 |
| 2004/0039968 | A1 * | 2/2004 | Hatonen ............... G06K 9/6284 714/39 |
| 2006/0149808 | A1 * | 7/2006 | Weiner ................... G06Q 10/06 709/203 |
| 2006/0149837 | A1 * | 7/2006 | Weiner ................... G06Q 10/00 709/224 |
| 2010/0027432 | A1 * | 2/2010 | Gopalan ............... H04L 41/142 370/252 |
| 2010/0299287 | A1 * | 11/2010 | Cao ....................... H04L 41/142 706/12 |

(Continued)

*Primary Examiner* — Aftab N. Khan

(57) ABSTRACT

A system may collect, from a wireless network, first data pertaining to nodes in the wireless network. Each datum of the first data belongs to one of two or more categories/For each of the nodes, for each of the categories, and for each datum belonging to the category, the system may determine if the datum is outside of a first range of values, and if the datum is inside the first range, the system may calculate a first base network performance health (NPH) score that is a function of the nodes, the categories, the data, and time. The system may also apply first deep learning to a first neural network among a plurality of neural networks to update first coefficients for correlating the first base NPH score to a mean opinion score, for each of the categories.

20 Claims, 23 Drawing Sheets

(56) References Cited

U.S. PATENT DOCUMENTS

| | | | |
|---|---|---|---|
| 2012/0278477 A1* | 11/2012 | Terrell | H04L 41/5009 |
| | | | 709/224 |
| 2014/0153396 A1* | 6/2014 | Gopalan | H04L 41/142 |
| | | | 370/235 |
| 2017/0026250 A1* | 1/2017 | Hu | H04L 41/147 |

* cited by examiner

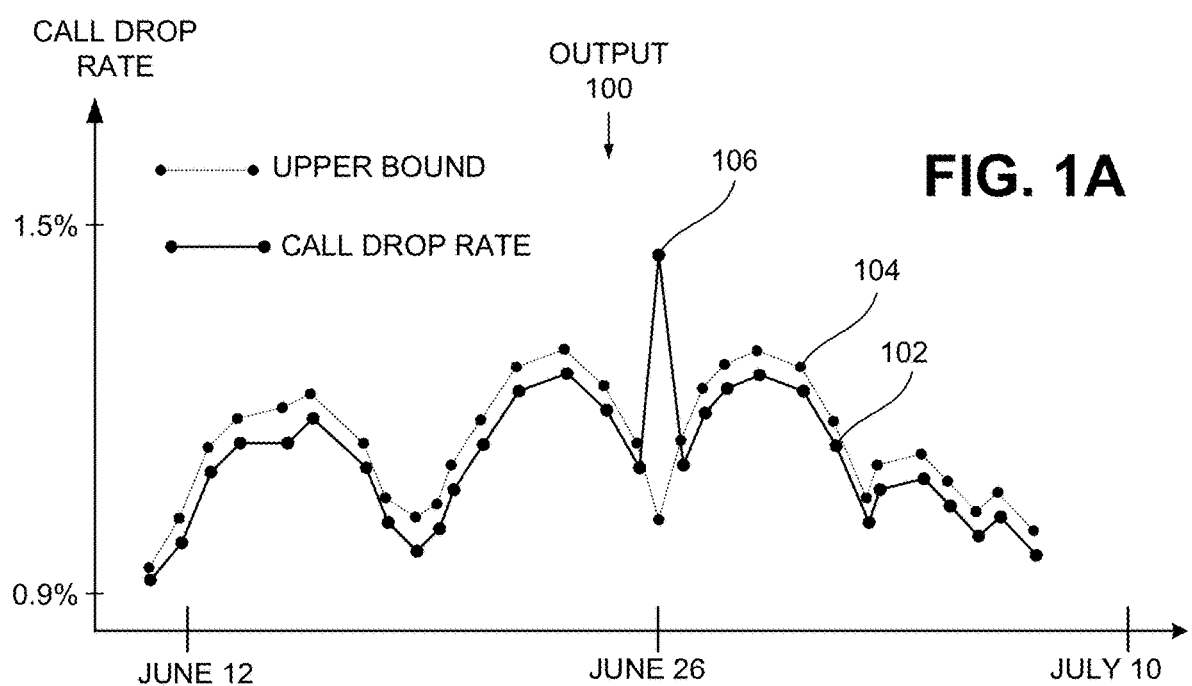

700

```
1    FOR EACH NODE
2        FOR EACH CATEGORY OF KPI
3            FOR EACH KPI
4                DETERMINE IF KPI IS LOWER-IS-BETTER
5                IF KPI IS LOWER-IS-BETTER
6                    DETERMINE QUANTILE TO WHICH KPI BELONGS
7                    IF KPI IS BETWEEN THE LOWER AND UPPER BOUNDS
8                        CALCULATE AUC
9                        CALCULATE PERFECT AUC
10                       CALCULATE BASE.NPH(KPI, CATEGORY, NODE, TIME)
11                   IF KPI IS SMALLER THAN THE LOWER BOUND
12                       SET THE BASE NPH TO 100%
13                   IF KPI IS LARGER THAN THE UPPER BOUND
14                       SET THE BASE NPH TO 0%
15               IF KPI IS HIGHER-IS-BETTER
16                   DETERMINE QUANTILE TO WHICH KPI BELONGS
17                   IF KPI IS BETWEEN THE LOWER AND UPPER BOUND
18                       CALCULATE AUC
19                       CALCULATE PERFECT AUC
20                       CALCULATE BASE NPH(KPI, CATEGORY, TIME)
21                   IF KPI IS SMALLER THAN THE LOWER BOUND
22                       SET THE BASE NPH TO 0%
23                   IF KPI IS LARGER THAN THE UPPER BOUND
24                       SET THE BASE NPH TO 100%
25           END FOR
26           CALCULATE THE CORRELATION SCORES BETWEEN MOS VALUES
                 AND CALCULATED NPH SCORES
27           DERIVE THE COEFFICIENTS WHICH MAXMIZE THE CORRELATION SCORES
28           USE BACKPROPAGATION TO UPDATE COEFFICIENTS OF
                 NEURAL NETWORK CNN1
29       END FOR
30       USE BACKPROPAGATION TO UPDATE COEFFICIENTS OF
             NEURAL NETWORK CNN2
31   END FOR
```

GRID DAILY NPH 2002
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH eNodeB DAILY NPH 2004
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH

CELL DAILY NPH 2006
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH

GRID BIWEEKLY NPH 2008
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH eNodeB BIWEEKLY NPH 2010
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH

CELL BIWEEKLY NPH 2012
- LTE OVERALL NPH
- LTE ACCESSIBILITY NPH
- LTE RETAINABILITY NPH
- LTE SERVICE INTEGRITY NPH
- LTE AVAILABILITY NPH
- LTE MOBILITY NPH

- VoLTE OVERALL NPH
- VoLTE ACCESSIBILITY NPH
- VoLTE RETAINABILITY NPH
- VoLTE SERVICE INTEGRITY NPH
- VoLTE AVAILABILITY NPH
- VoLTE MOBILITY NPH

NETWORK ANOMALY DETECTION AND NETWORK PERFORMANCE STATUS DETERMINATION

BACKGROUND INFORMATION

Past years have witnessed exponential growth of network users in the world. For example, global Long-Term Evolution (LTE) subscribers reached a total of 2.1 billion by the first quarter of 2017. Such staggering growth in the number of subscribers drives network traffic to rise quickly. Global mobile data traffic grew 63% in 2016, reaching 7.2 exabytes per month at the end of 2016, up from 4.4 exabytes per month at the end of 2015. Mobile data traffic in the world grew 180-fold over the past 5 years.

The snowballing effect of the mobile traffic growth has overwhelmed different data and voice networks. Data tsunami and signaling storms have been swamping these networks, and challenging existing cellular technologies. The traffic is still growing, along with users' demands on network performance.

For network service providers, the continued mobile traffic growth means the continued expansion of network capacity and the optimization of network performance so as to maintain the quality of service (e.g., throughput and latency) at an optimal level that is perceivable by users. Steps need to be taken in order to prepare the networks and business operations for the challenges of upcoming technology, such as 5G networks and Internet-of-things.

BRIEF DESCRIPTION OF THE DRAWINGS

FIG. 1A illustrates an exemplary output of an intelligent anomaly detector according to one implementation;

FIG. 12 illustrates logic associated with the process of FIG. 11;

FIG. 20 illustrates exemplary final NPH scores and final bi-weekly NPH scores for different types of nodes;

DETAILED DESCRIPTION OF PREFERRED EMBODIMENTS

Figure 1B:
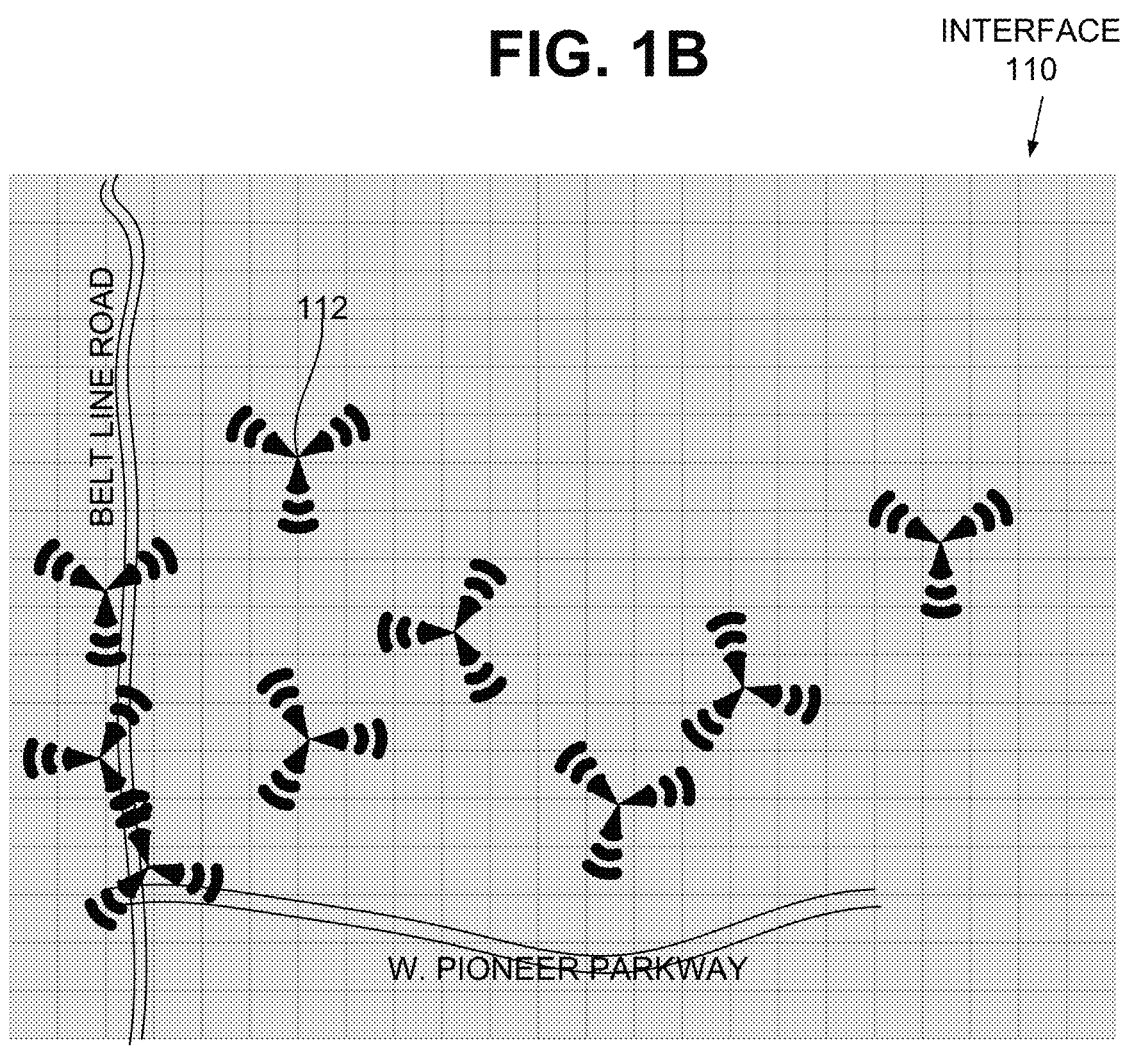
FIG. 1B illustrates a screenshot of an exemplary output associated with an exemplary network performance health monitor according to one implementation.

The following detailed description refers to the accompanying drawings. The same reference numbers in different drawings may identify the same or similar elements.

As described herein, a network includes a network performance optimization system. The system, in turn, comprises an intelligent anomaly detector, a network performance health monitor, and a network reconfiguration system. The intelligent anomaly detector detects and/or predicts potential network anomalies. Anomaly detection (i.e., outlier detection) includes the process of identifying events, observations, objects, and/or characteristics which do not conform to expected network patterns. An anomaly detector for a wireless network typically operates in a reactive mode. Accordingly, an anomaly in a network must first occur before the anomaly detector reports the anomaly. No matter how timely the report, the anomaly is reported after the fact, i.e., after the anomaly occurs since the detector operates in the reactive mode. In contrast, as described herein, an intelligent anomaly detector learns the latest traffic patterns and their characteristics to identify safety bands of operation and proactively identifies and reacts to anomalies in advance.

In addition to the intelligent anomaly detector, the network performance optimization system includes a network performance health monitor that focuses on user Quality of Experience (QoE). Traditional network optimizations are driven by performances of individual network elements. Network elements such as cells, eNodeBs, mobility management entities (MMEs), serving gateways (SGWs), packet data network gateways (PGWs), etc., are typically targeted to be optimized based on their operational parameters. Such optimizations, however, do not address users' QoE.

As described herein, a network performance health monitor extends the goal of achieving optimum network performance to maximizing user QoE. The network performance health monitor increases user QoE by tying together user perception, objective experience, and expectations to applications and network performance measured by network key performance indicators (KPIs).

The network performance optimization system further includes a network reconfiguration system. The network reconfiguration system receives the output from the intelligent anomaly detector and network performance health monitor. Based on the output, the network reconfiguration system modifies network settings and operating parameters, including but not limited to. those related to antenna (e.g., tilt angles, beam width, transmission power, etc.), routing paths, load balancing, bandwidths, etc.

FIG. 1A illustrates an exemplary output 100 of an intelligent anomaly detector according to one implementation. As shown, output 100 includes a plot 102 of call drop rates as a function of time. When the intelligent anomaly detector receives input data (i.e., call drop rates), the intelligent anomaly detector filters outliers 106 from the data, and uses the filtered data to generate an upper bound 104. Any point, on plot 102, that exceeds upper bound 104 may be subsequently detected as an anomaly. In addition, any predicted point (not shown) that exceeds upper bound 104 may be detected as a potential anomaly.

FIG. 1B illustrates a screenshot 110 of an output associated with the network performance health monitor. As shown, screen shot 110 includes a grid that is overlaid on a map, along with images of cells (e.g., cell 112). For each cell 112, each grid element (i.e., a shaded box), or each of other types of network elements (not shown), the network performance health monitor may determine network performance health scores that approximate true user QoE. Each health score may be determined for a specific technology (e.g., Long-term evolution (LTE), Voice-over-LTE (VoLTE)) and/ or for a specific time period, such as a day, a week, 2-weeks, a month, etc.

Figure 1C:
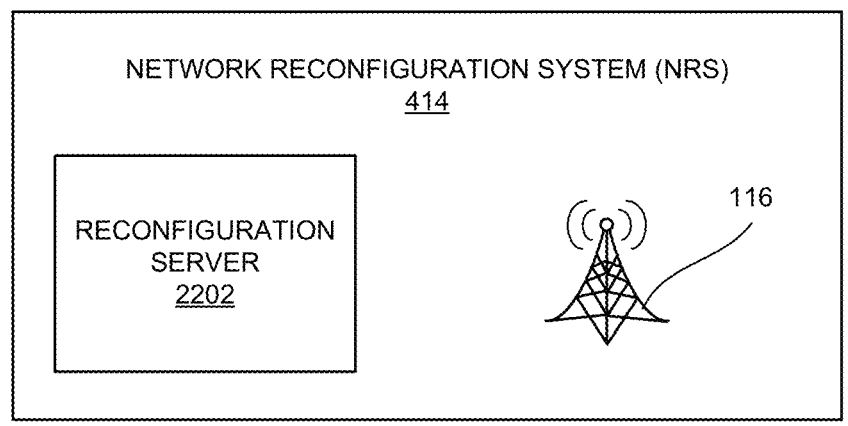
FIG. 1C illustrates an exemplary network reconfiguration system included in a base station according to one implementation.

FIG. 1C illustrates an exemplary network reconfiguration system 414 in an exemplary network. As shown, network reconfiguration system 114 may include a reconfiguration manager 2202 and a network node 116. Although network node 116 is illustrated as a base station in FIG. 1C, node 116 may include another type of node, such as a router, a load balancer, a switch, a gateway, a server (e.g., Domain Name Server), or another type of network element.

Reconfiguration manager 2202 may receive data indicating detected or anticipated anomalies and network performance health scores from the intelligent anomaly detector and network performance health monitor, respectively. Furthermore, based on the received information, reconfiguration manager 2202 may send data (e.g., regarding anomalies and health scores) and/or different commands to node 116, to change device settings at node 116 or its operating parameters to new values.

For example, assume that an antenna installed at base station 116 is tilted at a particular angle to accommodate an efficient handoff from another base station. Also assume that data pertaining to an anticipated/detected network anomaly on traffic and/or network performance health scores indicates that tilting the antenna in a slightly different direction may eliminate the potential anomaly and improve the health scores. In this example, network reconfiguration manager 2202 may send the data and/or a command to base station 116. In response, base station 116 may modify the direction of its antenna. For a network node different from a base station, network reconfiguration manager 2202 may send different data and/or commands from those for base stations, and such a node may respond in ways consistent with its function in the network.

Figure 2:
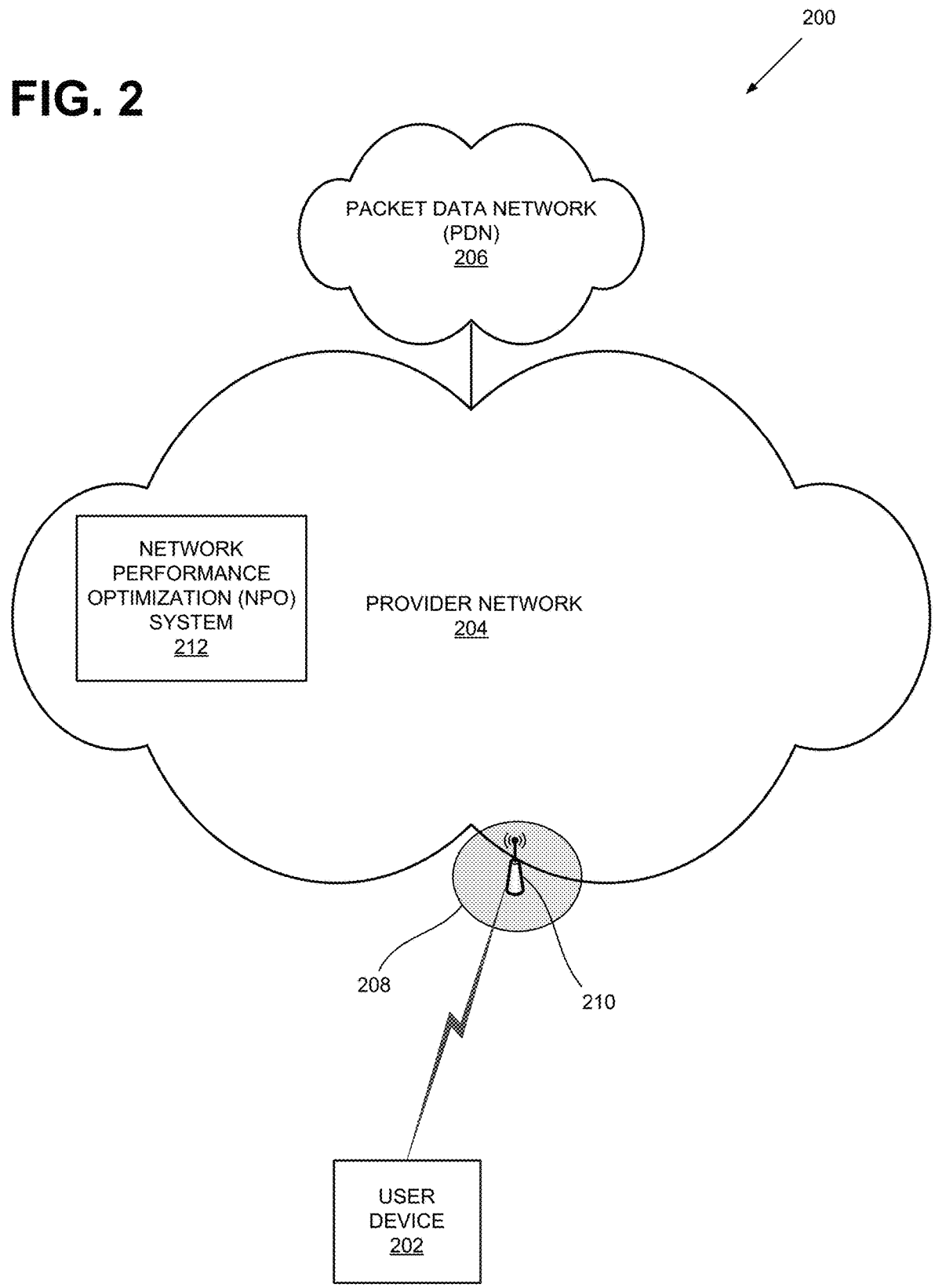
FIG. 2 illustrates an exemplary network environment in which the concepts described herein may be implemented.

FIG. 2 illustrates an exemplary network environment 200 in which a network performance optimization (NPO) system described herein may be implemented. As shown, environment 200 may include a user device 202, a provider network 204, and a packet data network (PDN) 206. Although environment 200 may include other devices and components, for simplicity, they are not illustrated. For example, environment 200 may include millions of user devices, routers, switches, computers (e.g., servers, personal computers, etc.).

User device 202 may include an electronic device having communication capabilities. For example, user device 202 may include a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, a digital camera that includes communication capabilities (e.g., wireless communication mechanisms), or Internet-of-Things (IoTs).

Provider network 204 may include one or more wireless and/or wireline networks of any type, such as, for example, a local area network (LAN), wide area network (WAN), wireless local area network (WLAN), wireless satellite network, and/or one or more wireless public land mobile networks (PLMNs). The PLMN(s) may include a Code Division Multiple Access (CDMA) 2000 PLMN, Global System for Mobile Communications (GSM) PLMN, Long Term Evolution (LTE) PLMN and/or other types of PLMNs not specifically described herein.

Depending on the implementation, provider network 204 may include an LTE network that includes an evolved UMTS Terrestrial Network (eUTRAN) 208. eUTRAN 208 may include one or more of eNodeB 210. eNodeB 210 may include one or more devices and components that allow user device 202 to wirelessly connect to provider network 204. Although referred to herein as eNodeB 210, in other network environments, features and functionality associated with eNodeB 210 may be implemented or performed by similar base station devices. Each of such devices may transmit to or receive signals from a specified area, herein referred to as a "cell."

As shown, provider network 204 may also include a network performance optimization (NPO) system 212, which in turn may include an intelligent anomaly detector, a network performance health (NPH) monitor, and a network reconfiguration system (not shown). As indicated above, the intelligent anomaly detector may detect or predict network anomalies. The NPH monitor may determine NPH scores for various network elements, a specific geographical area (e.g., an area represented by a grid element in FIG. 1B), a specific category of key performance indicator, for a specific time interval, and/or specific technology (e.g., LTE technology, VoLTE technology, etc.). The network reconfiguration system may modify operating parameters of network components based on the detected/anticipated anomalies and NPH scores.

Packet data network (PDN) 206 may include a network that supports Internet Protocol (IP)-based communications. PDN 206 may include, for example, an IP Multimedia Subsystem (IMS) network, which may provide voice and multimedia services to user device 202 based on the Session Initiation Protocol (SIP).

Although FIG. 2 shows NPO system 212 as a single component, depending on the implementation, NPO system 212 may be distributed over different network elements and different networks. For example, NPO system 212 may include network devices that collect user device information. In other embodiments, NPO system 212 may include user devices 202. In still other implementations, NPO system 212 may include network management stations (NMS). NPO system 212 may be designed in accordance with a centralized architecture or a decentralized architecture. NPO system 212 is described further below with reference to FIGS. 4-22.

Figure 3:
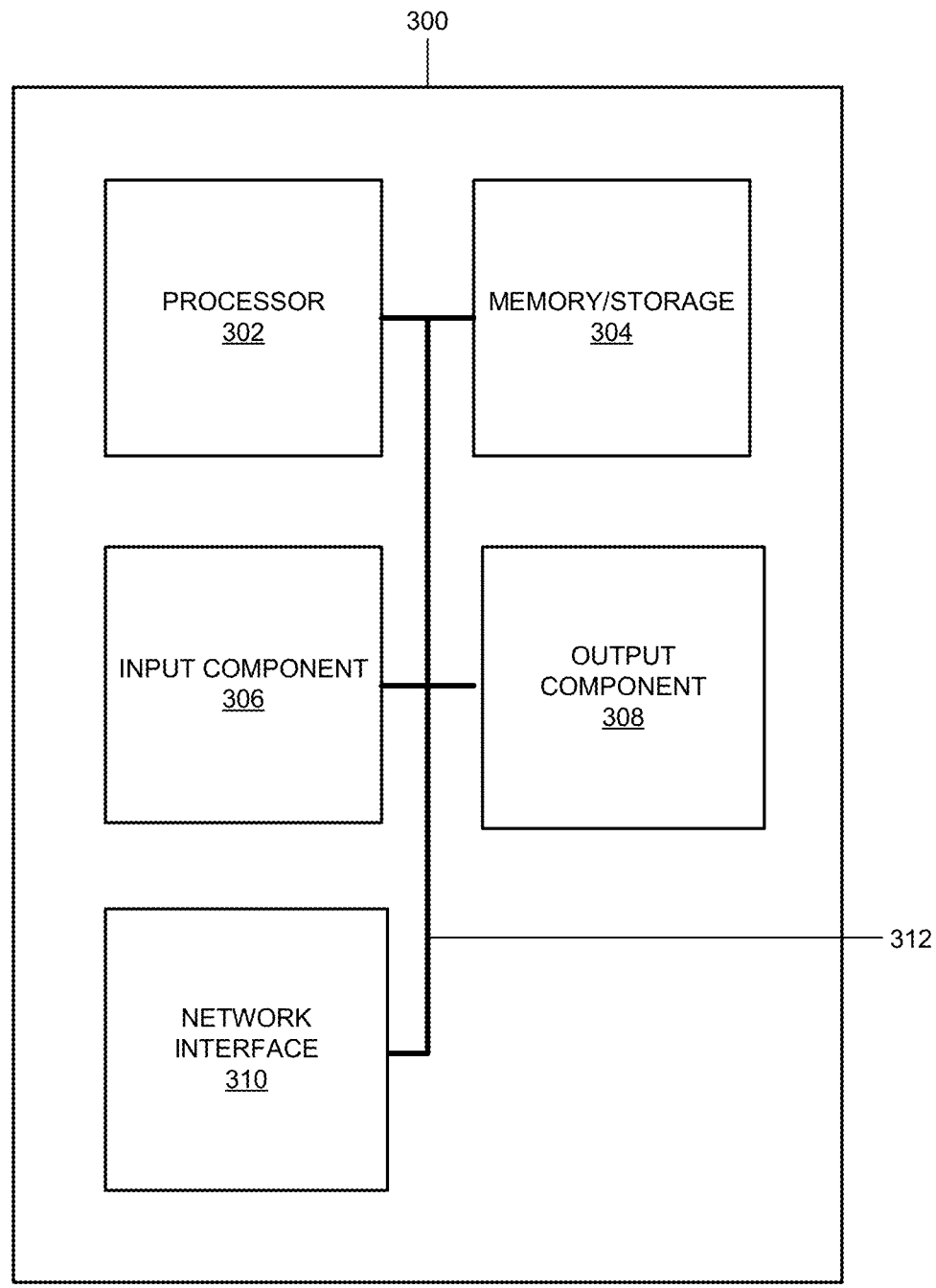
FIG. 3 illustrates exemplary components of network devices included in the network environment of FIG. 2.

FIG. 3 is a block diagram of exemplary components of a network device 300. Network device 300 may correspond to, or be included in, the devices and/or components of the networks depicted in FIG. 2 (e.g., user device 202, a router, a switch, a server, etc.). In some embodiments, NPO system 212 may be implemented on one or more of network device 300. As shown, network device 300 may include a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may receive input from a user and provide output to a user. Input/output components 306 and 308 may include, for example, a display screen, a keyboard, a mouse, a speaker, a microphone, a camera, a DVD reader, USB lines, and/or other types of components.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface (e.g., a bus) through which components of device 200 can communicate with one another.

In some implementations, network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein. For example, when network device 300 is implemented as user device 202, user device 202 may collect network data and provide the data to provider network 204. In another example, when network device 300 is implemented as NPO system devices, network device 300 may detect network anomalies or calculate NPH scores in accordance with program instructions. In yet another example, implemented as a network node (e.g., a load balancer) capable of responding to network reconfiguration manager 2202, network device 300 may re-route packets that require specific quality-of-service (QoS).

Figure 4:
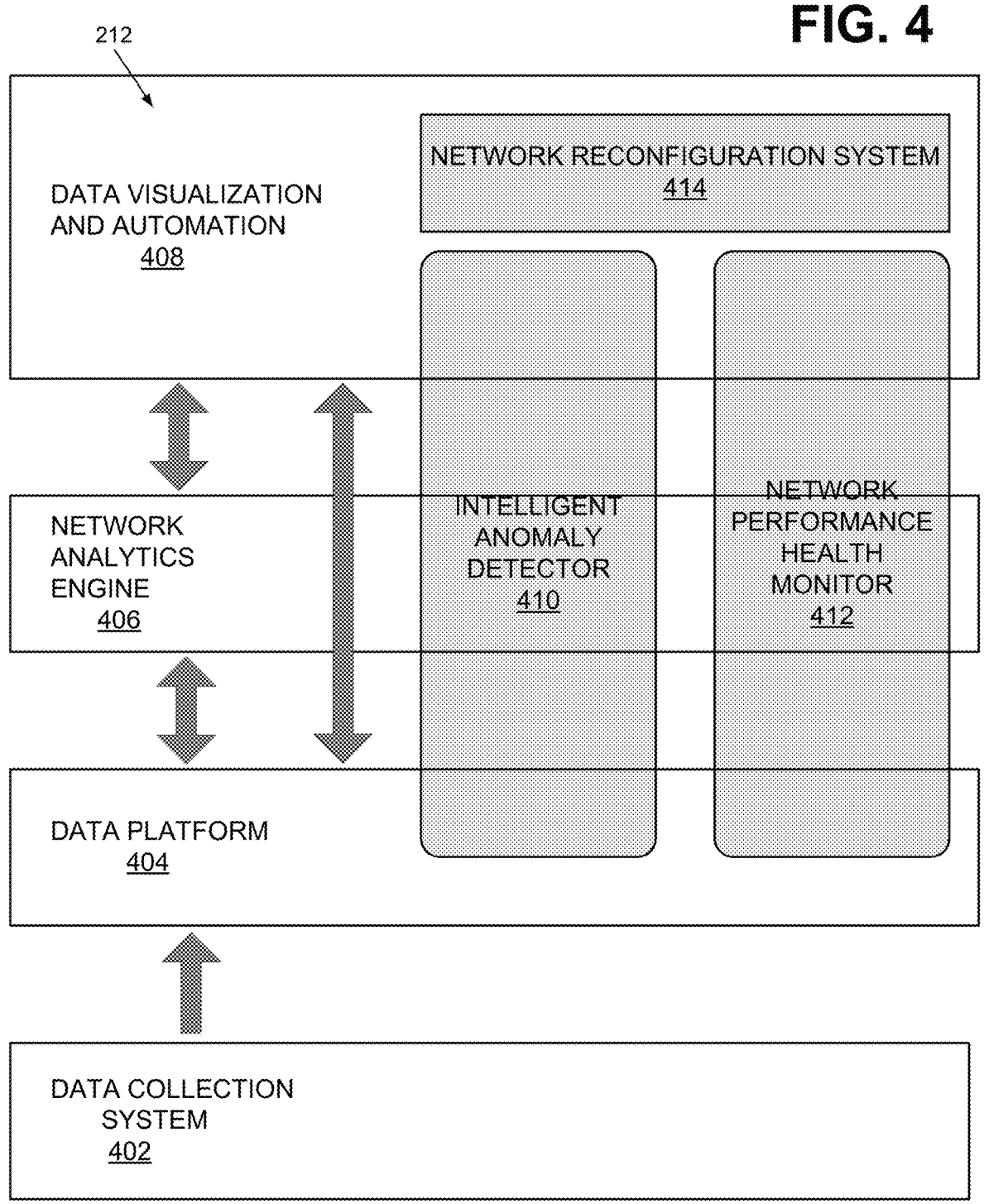
FIG. 4 shows exemplary components of a network performance analysis system of FIG. 2.

FIG. 4 illustrates exemplary components of NPO system 212. As shown, NPO system 212 may include a data collection system 402, a data platform 404, a network analytics engine 406, and a data visualization and automation system 408. Depending on the implementation, NPO system 212 may include additional, fewer, different, or differently arranged components than those illustrated in FIG. 4.

Data collection system 402 may include components for obtaining network data, network statistics (e.g., traffic, delays, jitter, bandwidth, call drop rates, handoffs, bearer identifier, service availability, etc.), Key Performance Indicators (KPIs), user mean opinion scores (MOS), etc. The information may be obtained from user devices, Internet-of-Things (IoT) devices, eNodeBs, server devices, routers, switches, applications, servers, service components (e.g., MME, PGW, etc.), etc. Some of the data may include KPIs pertaining to device statistics, network traffic data (e.g., volume, location at which the measurements are taken), time, jitter, delay/latency, power (e.g., signal-to-interference and noise ratio), antenna characteristics, call drop rates, application characteristics (e.g., TCP connection request success rate), etc.

Data collection system 402 may collect data at regular time intervals (e.g., according to a schedule), based on demand, and/or based on event triggers. Data collection system 402 may provide the collected data to data platform 404 through one or more interfaces, such as a MySQL interface, a JSON interface, a JDBC interface, etc.

Data platform 404 may receive data from data collection system 402, process some of the data to generate statistics, store the raw or processed data, and make the data available for other components, such as network analytics engine 406 or data visualization and automation system 408. In storing and/or processing data, data platform 404 may leverage one or more big data platforms.

Network analytics engine 406 may include many components with logic for determining and computing network parameters, including those for: identifying network anomalies based on learning; generating NPH scores; modifying neural network (e.g., calculating neural network weights); etc.

Data visualization and automation system 408 may perform output functions for data platform 404 and network analytics engine 406. For example, data visualization and automation system 408 may provide output similar to those illustrated in FIG. 1A or 1B. In addition, data visualization and automation system 408 may allow users to input information into NPO system 212, control different components and devices of NPO system 212 and provider network 204, administer accounts/other users, etc. In some implementations, data visualization and automation system 408 may provide different forms of network alerts to operators (e.g., send a message to a network operator), take appropriate actions with respect to network (e.g., change device settings), reallocate resources (e.g., bandwidth allocation, recalibrate load balancing systems, etc.), reconfigure network components, route packets through particular paths, etc.

As further shown in FIG. 4, NPO system 212 may include an intelligent anomaly detector 410. network performance health (NPH) monitor 412, and network reconfiguration system 414. Each of intelligent anomaly detector 410, NPH monitor 412, and network reconfiguration system 414 may use or incorporate data visualization and automation system 408, network analytics engine 406, and data platform 404. Intelligent anomaly detector 410, NPH monitor 412, network reconfiguration system 414 are described further below with references to FIGS. 5-22.

Figure 5:
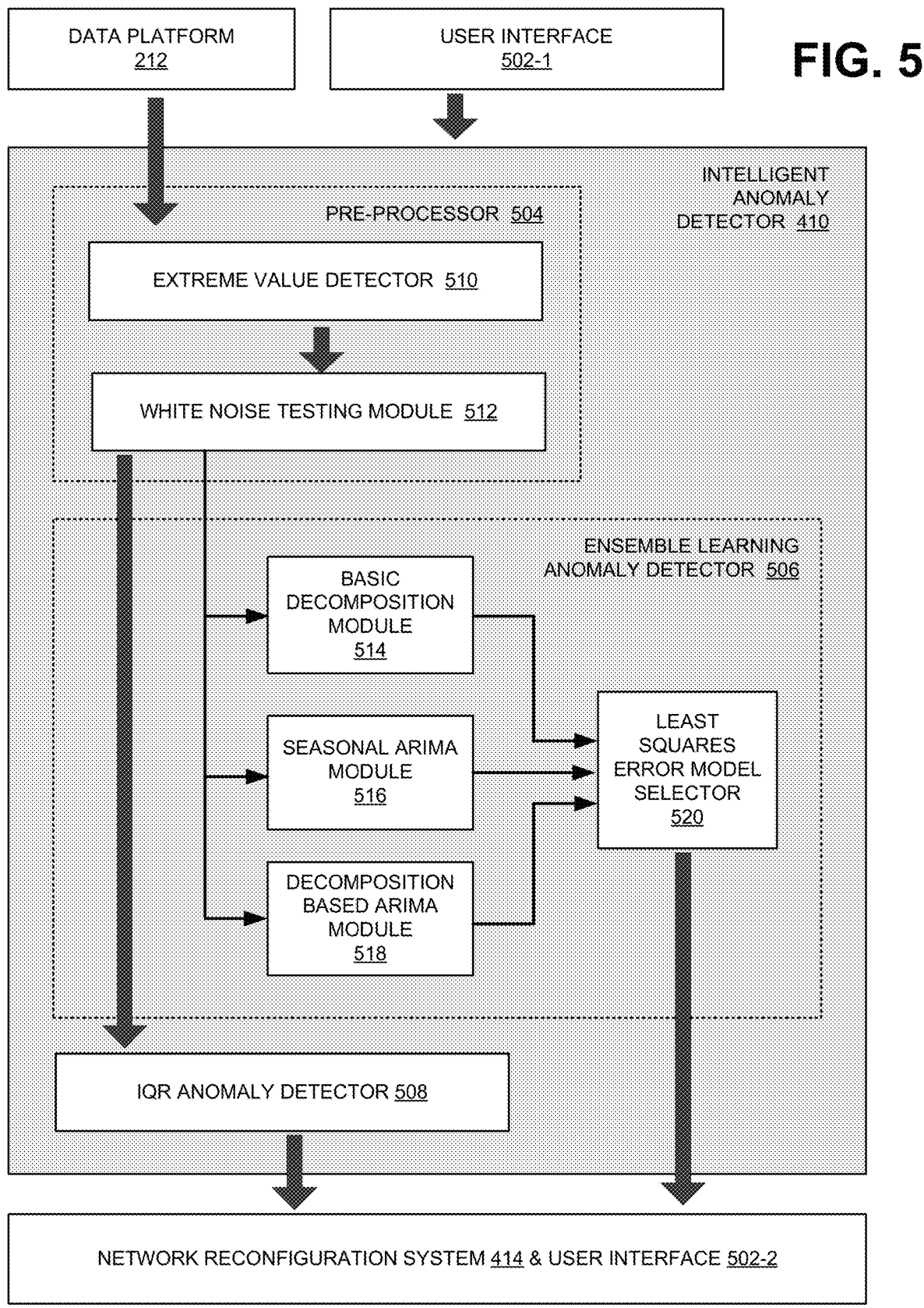
FIG. 5 shows exemplary components of the exemplary intelligent anomaly detector of FIG. 4.

FIG. 5 shows exemplary functional components of intelligent anomaly detector 410. As shown, intelligent anomaly detector 410 may include a pre-processor 504, an ensemble learning anomaly detector 506, and an Interquartile (IQR) detector 508. Pre-processor 504, in turn, may include an extreme value detector 510 and a white-noise detector 512. Ensemble learning anomaly detector 506, in turn, may include a basic decomposition module 514, a seasonal autoregressive integrated moving average (ARIMA) module 516, a decomposition based ARIMA module 518, and a least squares error model selector 520. In operation, intelligent anomaly detector 410 receives user input from user interface 502-1 and provides output to user interface 502-2.

Pre-processor 504 receives data (e.g., KPIs) from data platform 404 and prepares the data for further processing. The preparation may include filtering extreme-valued data points, by applying extreme value detector 510, and then determining whether the filtered data is essentially white noise, by applying white-noise testing module 512. Depending on the implementation, pre-processor 504 may include additional functional components required to further process data.

Figure 6:
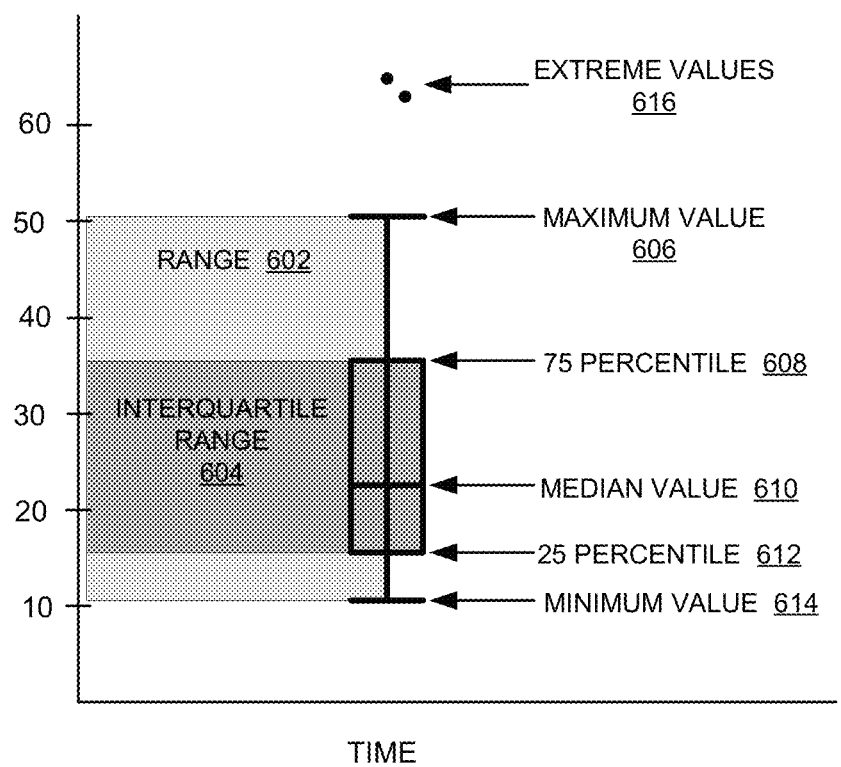
FIG. 6 shows an exemplary box plot of input data to the intelligent anomaly detector of FIG. 5.

Extreme value detector 510 may remove data points whose values are extreme (e.g., higher or lower-valued than the rest of the data set by a given amount). According to one implementation, extreme value detector 510 may divide the data into interquartile ranges, and classify data points outside of specific bounds as "extreme." FIG. 6 illustrates the concept with an exemplary box plot of data. As shown, data (without extreme values) spans a range 602 bounded by the maximum value 606 and the minimum value 614. 50% of data fall in the interquartile range 604, with 25% of data above the 75 percentile 608 ($Q_3$) and 25% of data below the 25 percentile 612 ($Q_1$). Extreme values 616 fall outside range 602 and satisfy threshold criteria. For example, in one implementation, extreme values must be larger than about 1.5 IQR+$Q_3$ or less than about $Q_1$ 1.5 IQR. After extreme value detector 510 detects data points with extreme values and filters them from the data set, extreme value detector 510 provides the filtered data to white-noise detector 512.

White-noise detector 512 may determine whether the filtered data is white noise. White noise is completely random, and there is no relationship between any two points in the data set. In one implementation, white-noise detector 512 may use the Ljung-Box test to determine whether the filtered data is white noise. In other implementations, white-noise detector 512 may use a different test to determine whether the data is white noise (e.g., Bartlett test).

Figure 7A:
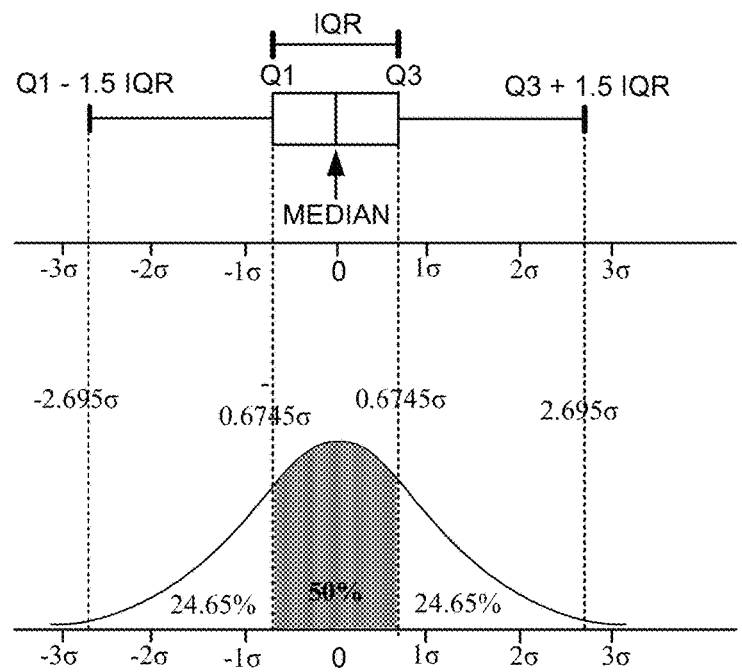
FIG. 7A illustrates exemplary interquartile ranges (IQRS) associated with input data.

IQR anomaly detector 508 may detect anomalies in a data set if white-noise testing module 512 determines that the filtered data is white noise. IQR anomaly detector 508 identifies data points that lie outside of a specific range of values as anomalies. FIG. 7A illustrates the concept. As shown, data that lie within the range [$Q_1$, $Q_3$] (the values of $Q_1$ and $Q_3$ are defined so that the range [$Q_1$, $Q_3$] includes 50% of data) is deemed normal, and data that lie outside of the range [$Q_1$−1.5 IQR, $Q_3$+1.5 IQR] are anomalies. As also shown, $Q_1$ is approximately equal to −0.674σ and $Q_3$ is approximately equal to 0.674σ, where a denotes the standard deviation of the illustrated function.

Figure 7B:
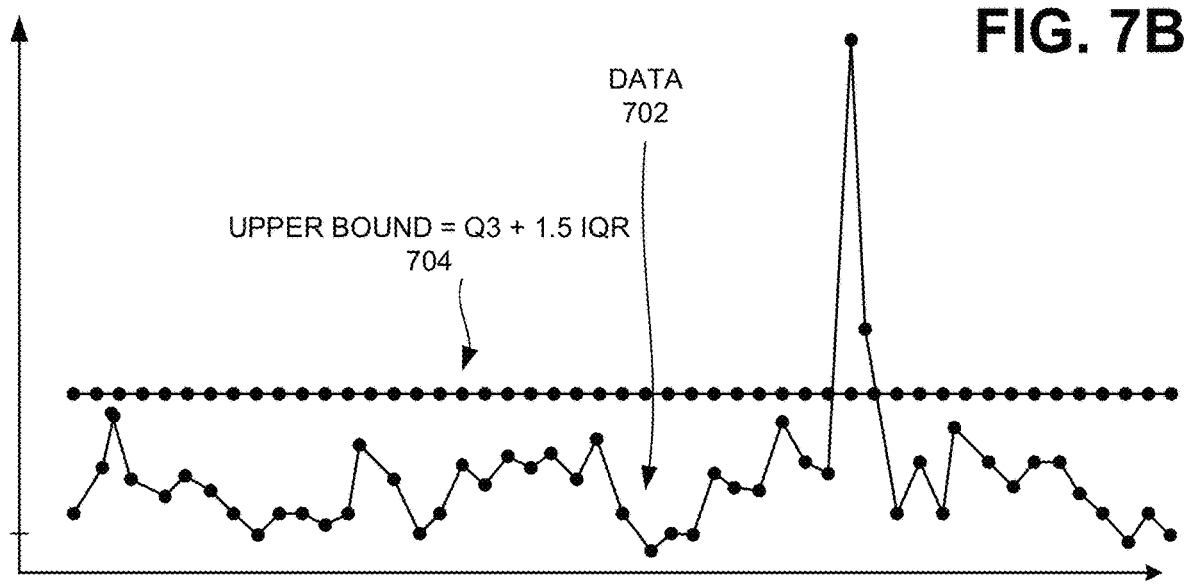
FIG. 7B illustrates an exemplary output of the intelligent anomaly detector of FIG. 4 and FIG. 5.

FIG. 7B illustrates an exemplary plot 702 of data to which IQR anomaly detector 508 has been applied. As shown, unfiltered data is plotted with an upper bound 704, also obtained by applying IQR anomaly detector 508. Data points whose values are above the upper bound by a specified margin are deemed anomalies. A lower bound is not illustrated.

Returning to FIG. 5, ensemble learning anomaly detector 506 may detect anomalies in the filtered data when white noise testing module 512 determines that the filtered data is not white noise. In such a case, ensemble learning anomaly detector 506 may use a basic decomposition module 514, a seasonal ARIMA module 516, a decomposition based ARIMA module 518, or a least-squares error model selector 520 to detect or predict anomalies. Which of modules 514-520 is selected depends on user input provided through user interface 502-1.

FIGS. 8A-8D illustrate operations of basic decomposition module 514. As its name implies, basic decomposition module 514 decomposes input data into, for example, three components: a trend component, a seasonal component, and a noise component. That is, the input data is approximated as:

$$I(t)=T(t)+S(t)+N(t) \tag{1}$$

where I(t) is the input data, T(t) is the trend component, S(t) is the seasonal component, and N(t) is the noise component.

Figure 8A:
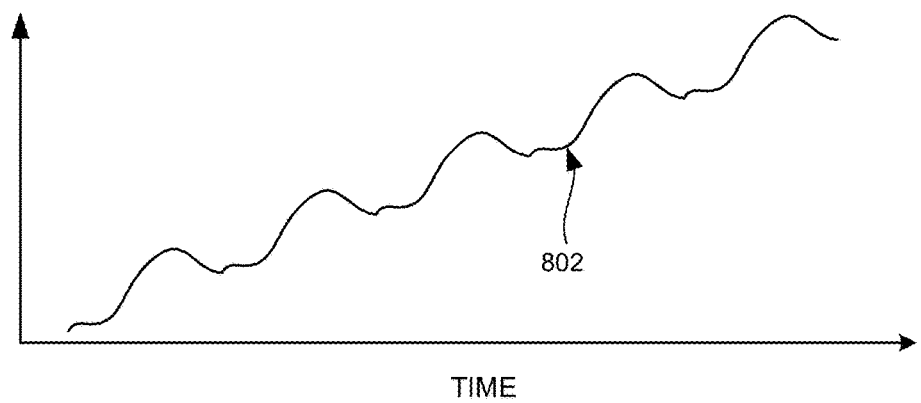
FIG. 8A shows an exemplary plot of input data as a function of time.
Figure 8B:
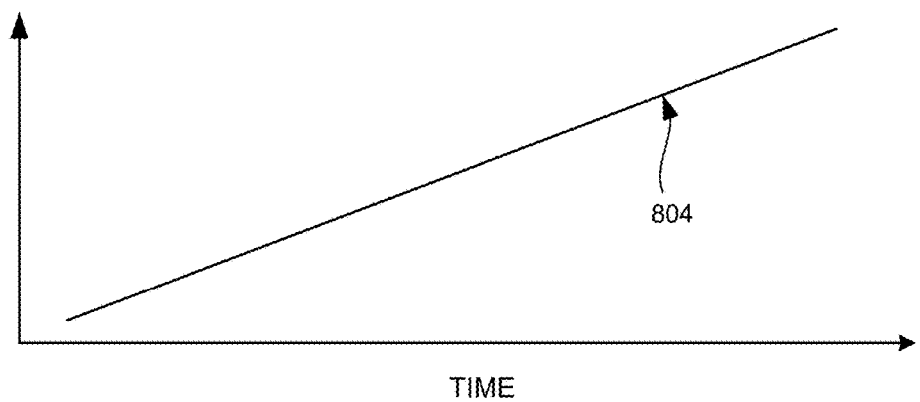
FIG. 8B shows an exemplary trend component associated with the plot of FIG. 8A.
Figure 8C:
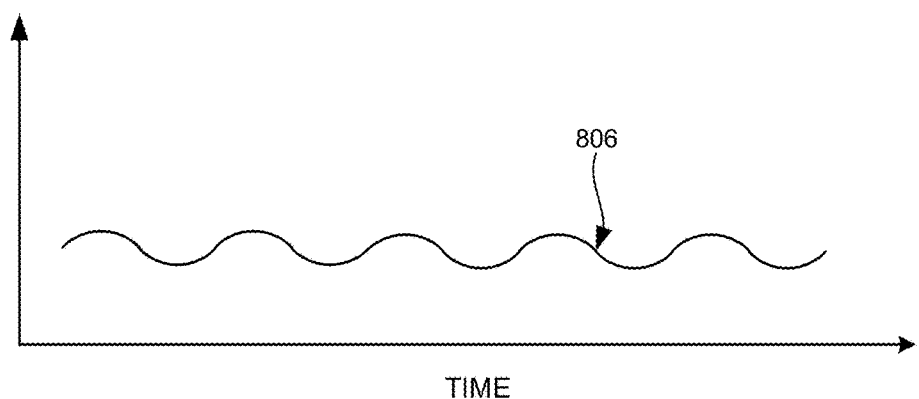
FIG. 8C shows an exemplary seasonal component associated with the plot of FIG. 8A.
Figure 8D:
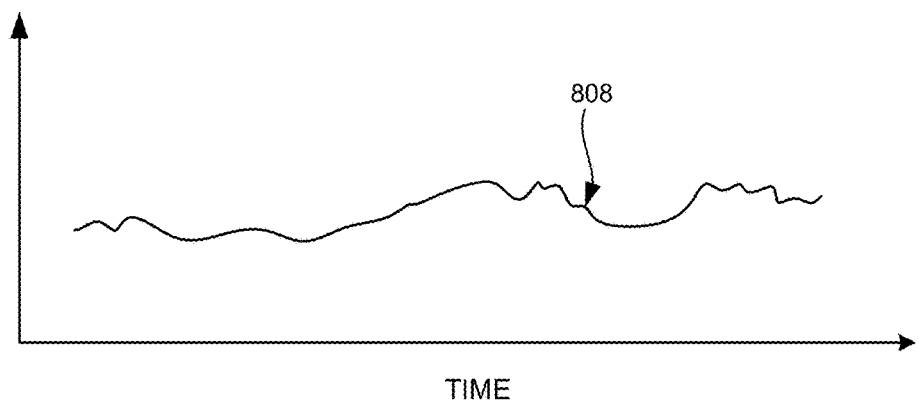
FIG. 8D shows an exemplary plot of data whose trend and seasonal components have been removed.

FIG. 8A is a plot 802 of I(T). In FIG. 8A, I(t) increases as a function of time in an undulating manner. FIG. 8B illustrates a plot of T(t), which is a trend component 804 that has been isolated from input data 802. T(t) increases monotonically over the shown period of time. Although shown as a line, in different implementations, T(t) may be a nonlinear function. FIG. 8C shows a plot of S(t), which is a seasonal component 806 that has been isolated from I(t). S(t) may be cyclic, having a period after which S(t) repeats. FIG. 8D shows a plot of N(t), which is a noise component 808 that has been isolated from I(t). N(t) may be obtained by removing or subtracting T(t) and S(t) from I(t).

Returning to FIG. 5, seasonal ARIMA module 516 models input data as being composed of a non-seasonal component and a seasonal component. This can be expressed as:

$$y_t = y_s + y_n \qquad (2),$$

where $y_s$ is the seasonal component and $y_n$ is the non-seasonal component. $y_s$ and $y_n$ are defined by different expressions:

$$y_n(t): y'_t = y_t - y_{t-1}$$

$$y_s(t): y'_t = y_t - y_{t-m}$$

where m is the number of seasons. After the seasonal component is removed from the data set, the remaining data can then be modeled as an autoregressive moving average (ARMA):

$$X(t) = c + \varepsilon_t + \sum_{i=1}^{p} \phi_i X_{t-i} + \sum_{i=1}^{q} \theta_i \varepsilon_{t-i} \qquad (3)$$

In expression (3), c is a constant, $\varepsilon_i$, $\varepsilon_{i-1}$, ... are white noise, $\phi_i$ and $\theta_i$ are parameters of the ARMA model. The sum over $X_{i-1}$ is the autoregressive term, and the sum over $\theta_i$ is the moving average term. In one implementation, data points that significantly deviate from the predicted values can be identified as anomalies.

Decomposition based ARIMA module 518 combines the features of basic decomposition module 514 and seasonal ARIMA module 516. Seasonal ARIMA module 516 is useful for prediction, but its results may not be easy to interpret. Basic decomposition module 514 generates results that are easy to interpret, but may not use some information in noise component 808 that can be used for making more accurate predictions. The function of decomposition based ARIMA module 518 can be summarized as:

$$X(t) = T(t) + S(t) + A(t)$$

where T(t) is a trend component, S(t) is a seasonal component, and A(t) is an autoregressive component, Decomposition based ARIMA module 518 applies basic decomposition module 514 to remove trend and seasonal components, and then applies an autoregressive model for prediction of future values.

Figure 9:
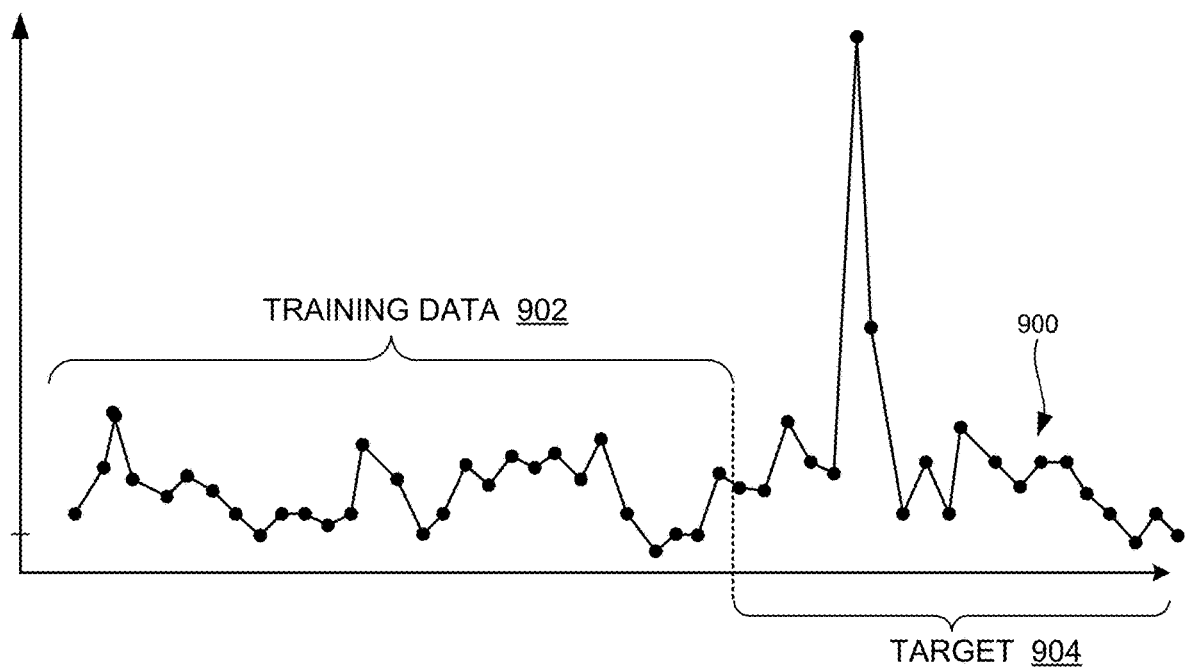
FIG. 9 illustrates an exemplary plot of input data for the exemplary least-squares error model selector of FIG. 5.

Least-squares error model selector 520 applies the results or output of basic decomposition module 514, seasonal ARIMA module 516, and decomposition based ARIMA module 518. Subsequently, selector 520 determines a set of coefficients for forming a linear combination, of the outputs of modules 514-518, that leads to least-squares errors between predicted values and the input. FIG. 9 illustrates an exemplary plot of data input to least-squares error model selector 520. As shown, input data 900 includes training data 902, which is then used to find the coefficients for the output of modules 514-518 to obtain least-squares errors between the input data and the predicted values. The resulting least-squares model is then applied to target range 904.

Although FIG. 5 illustrates particular components of intelligent anomaly detector 410, in different implementations, intelligent anomaly detector 410 may include additional, fewer, or different components, or a different arrangement of components, than those illustrated. For example, ensemble learning anomaly detector 506 may include additional statistical modules for prediction (e.g., Kalman filtering module). In another example, pre-processor 504 may apply smoothing functions to raw data before the data is further processed by ensemble learning anomaly detector 506.

Figure 10:
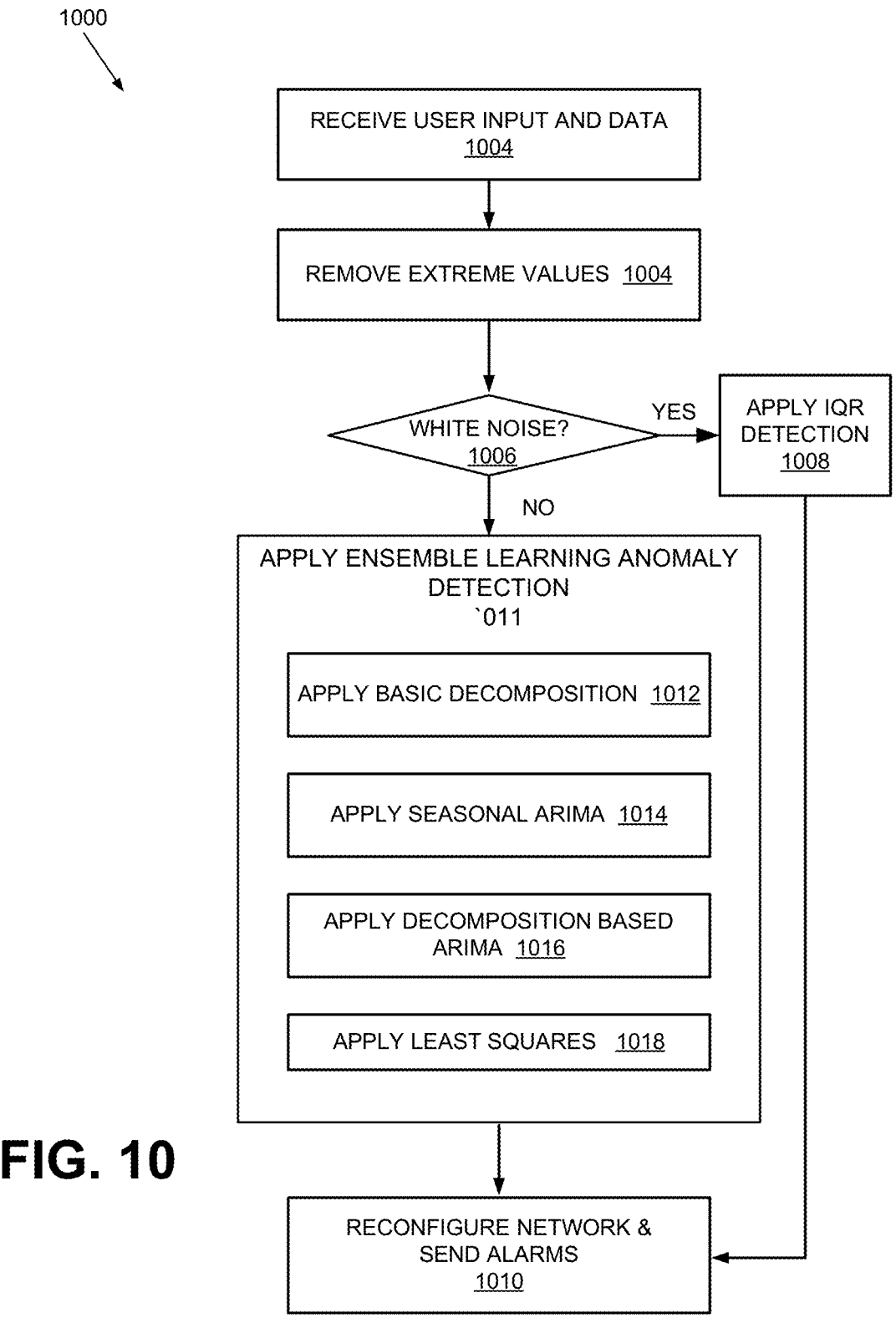
FIG. 10 is a flow diagram of an exemplary process that is associated with the intelligent anomaly detector of FIG. 4 and FIG. 5.

FIG. 10 is a flow diagram of an exemplary process 1000 that is associated with the intelligent anomaly detector 410. In some implementations, process 1000 may be performed by NPO system 212.

As shown, process 1000 may include receiving user input and data (block 1002). For example, intelligent anomaly detector 410 may receive specific series of KPIs from data platform 404. The KPIs may include, for example, call drop rates, handover failure counts, jitters, etc. In addition to the data, intelligent anomaly detector 410 may receive user input. For example, intelligent anomaly detector 410 may receive user selection of a particular module (among modules 514-520) to detect anomalies. In one implementation, intelligent anomaly detector 410 may run continually on a series of input data using the same selected module until the selection is changed.

Process 1000 may include removing extreme values from the input data (block 1004). For example, extreme value detector 510 may remove data points that are outliers. In one implementation, extreme value detector 510 may identify data points that are outside of [$Q_1$−1.5 IQR, $Q_3$+1.5 IQR] as being extreme and filter the data.

Process 1000 may further include determining if the filtered data is white noise (block 1006). For example, white-noise testing module 512 may apply the Ljung-Box test to determine if the filtered data is white noise. If the filtered data is white noise (block 1006—YES), process 1000 may perform the IQR detection test (block 1008). For example, process 1000 may apply IQR anomaly detector 508 (block 1008). As described above, IQR anomaly detector 508 may apply the interquartile testing to the unfiltered data. to identify any points that are in the extreme ranges.

Returning to block 1006, if the filtered data is not white noise (block 1006—NO), the data points are interrelated and may have detectable patterns. Accordingly, process 1000 may apply the ensemble learning anomaly detection scheme (block 1011). In one embodiment, when applying the ensemble learning anomaly detection scheme, any of modules 514-520 may be used. For instance, depending on user input, detecting anomalies may include using basic decomposition module 514 (block 1012), using seasonal ARIMA module 516 (block 1014), using decomposition based ARIMA module 518 (block 1016), or using least-squares error model selector 520 (block 1018), as already described above. Applying least-squares error selector 520, however, requires first applying modules 514-518, and then learning an appropriate linear combination of the results of applying modules 514-518 (i.e., finding linear coefficients that minimize the least-squares errors between the data and the predicted values). If the coefficients are found, they can be stored, and the coefficients can be updated as more data are received and applied.

After the output of either the IQR detection (block 1008) or the ensemble learning anomaly detection (1011) is generated, the output may be processed (block 1010). Depending on the user input, the output may be graphed (e.g., along with the upper bound and lower bound) as function of time, alarms/alerts may be sent to operators, and/or appropriate actions may be taken as countermeasures (e.g., by components other than intelligent anomaly detector 410). For example, certain packets may be re-routed, device parameters may be modified, antenna tilt angles may be changed, or other actions may be taken as countermeasures against detected anomalies or to prevent the anomalies in the predicted values from emerging in real data.

When process 1000 is performed, intelligent anomaly detector 410 may predict potential, future anomalies, even though no anomalies may currently exist. Because intelligent anomaly detector 410 is predictive, it can drive the network to take steps to prevent the anomalies before they occur.

Figure 11:
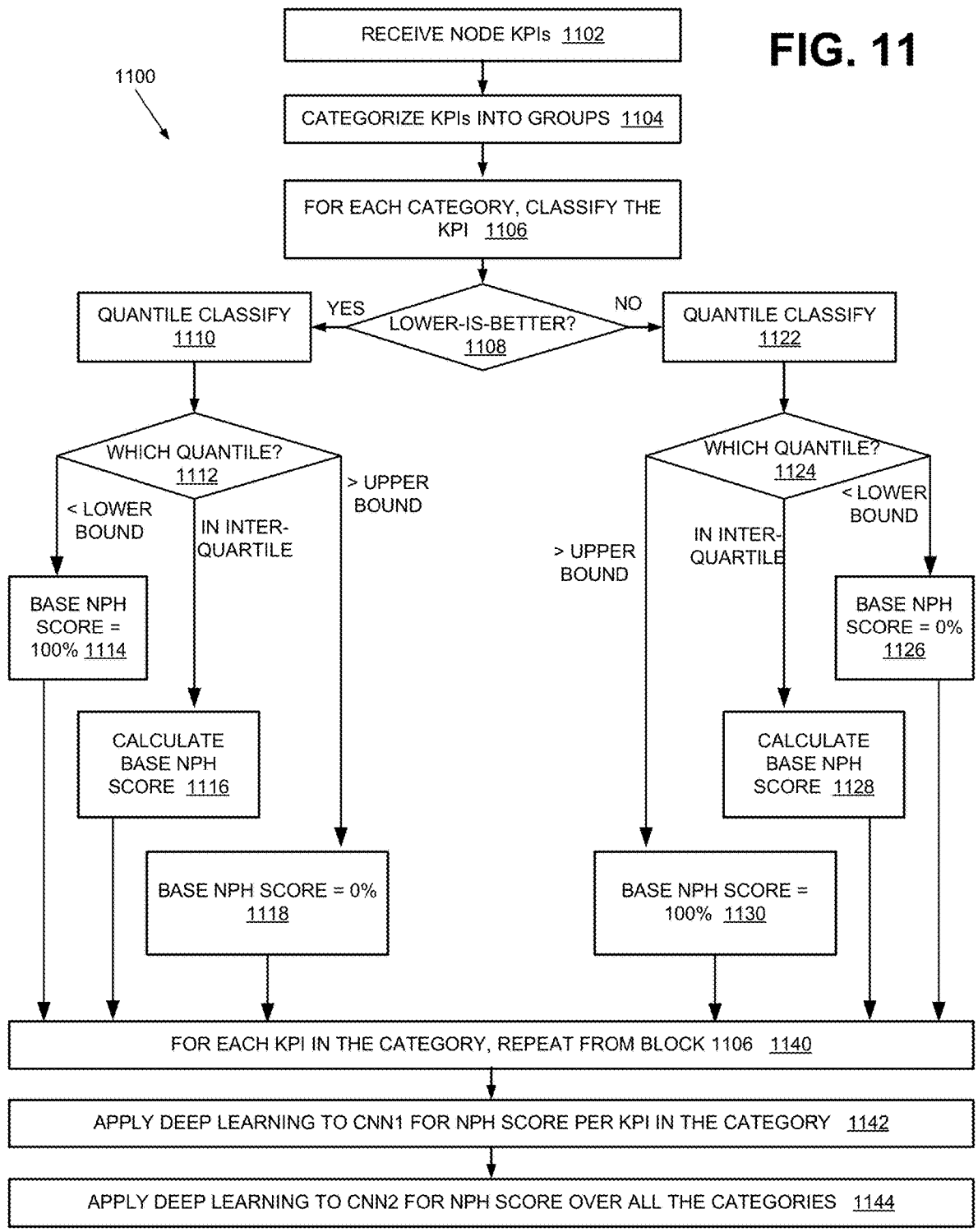
FIG. 11 illustrates an exemplary process that is associated with the exemplary network health monitor of FIG. 4.

As discussed above, NPO system 212 not only includes intelligent anomaly detector 410, but also includes network performance health (NPH) monitor 412. NPH monitor 412 measures both user QoE and network performance. FIG. 11 illustrates an exemplary process 1100 that is associated with NPH monitor 412.

As shown, process 1100 may include receiving KPIs for a specified time interval (e.g., a day) (block 1102). For each node (e.g., eNodeB, cell, etc.), each received KPI is categorized (block 1104) based on its relevance to one of the following five categories: accessibility, retainability, availability, mobility and service integrity for a particular type of network technology (e.g., LTE or VoLTE). A sub-process for handling the specific category of KPIs then classifies a particular KPI as either lower-is-better or higher-is-better (block 1106). "Lower-is-better" means that lower the value of a KPI, higher the performance of the network component/element to which the KPI pertains. If the KPI is the higher-is-better type, then lower the value of the KPI, lower the performance of the network component/element to which the KPI pertains. Each sub-process is performed for each KPI, each of the KPI categories, and the specified time interval.

FIG. 12 illustrates exemplary logic of process 1100. As shown, lines 1-3 indicate that the KPIs are processed for each network node (e.g., eNodeB or cell) and each category of KPI (i.e., availability, retainability, accessibility, mobility, service integrity). For each category and network node to which the KPI pertains, each KPI is classified as either lower-is-better or higher-is-better. These operations are illustrated in FIG. 12, beginning with entries into for-loops over nodes, over each KPI category, and then over each KPI.

Returning to FIG. 11, at block 1108, if the KPI is lower-is-better (block 1108: YES), process 1100 may determine to which interquartile the KPI belongs (block 1110). If the KPI is lower than the lower bound (e.g., Q1−1.5 IQR) (block 1112: <LOWER BOUND), the base NPH score for the node and the KPI is set to 100% (block 1114). If the KPI is greater than the upper bound (block 1112: >Q3+1.5 IQR), process 1100 may set the NPH score for the node and the KPI to 0% (block 1118). If the KPI is between the lower bound and the upper bound (block 1112: in interquartile), process 1100 may calculate the base NPH score based on the cumulative distribution function (CDF) for the KPI (block 1116).

In FIG. 12, lines 11-12 correspond to block 1114 of FIG. 11, lines 13-14 correspond to block 1116, and lines 7-10 correspond to block 1116. Assuming that the base NPH score is denoted by Base.NPH(KPI, CATEGORY, NODE, TIME), determining the base NPH requires first determining a cumulative distribution function for the particular KPI and determining areas under/over the CDF. Given a series of KPI values, the cumulative distribution function (CDF) may be first determined using well-known techniques. Next, an area under the curve (AUC) may be determined for the CDF, in the range between an upper bound U (e.g., 97.5% threshold) and the particular KPI value. This can be expressed as:

$$AUC_{KPI\ CATEGORY\ NODE} = \int_{KPI}^{U} CDF(KPI)d(KPI) \quad (4)$$

Figure 13A:
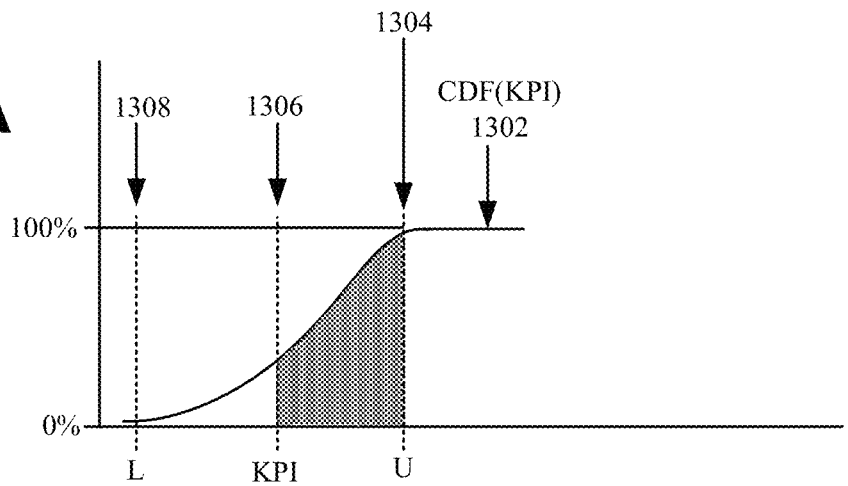
FIGS. 13A and 13B illustrate areas under a curve (AUC) for a key performance indicator (KPI)

FIG. 13A illustrates the AUC, for a KPI classified as lower-is-better. In FIG. 13A, the AUC is the shaded area under 1302, ranging from U 1304 to KPI 1306. The AUC can be normalized by the AUC in the range [L, U]. The normalizing area, denoted as Perfect AUC, is given by:

$$\text{Perfect AUC}_{KPI\ CATEGORY\ NODE} = \int_{L}^{U} CDF(KPI)d(KPI) \quad (5)$$

The base NPH score is computed in terms of the AUC and Perfect AUC as:

$$\text{Base.NPH}(KPI, CATEGORY, NODE, TIME) = AUC_{KPI\ CATEGORY\ NODE} / \text{Perfect AUC}_{KPI\ CATEGORY\ NODE} \quad (6)$$

Returning to block 1108, if the KPI is not lower-is-better (block 1108: NO), process 1100 may determine to which interquartile the KPI belongs (block 1122). If the KPI is lower than the lower bound (e.g., Q1−1.5 IQR) (block 1124: <LOWER BOUND), the base NPH score for the node and the KPI is set to 0% (block 1126). If the KPI is greater than the upper bound (block 1124: >Q3+1.5 IQR), process 1100 may set the NPH score for the node and the KPI to 100% (block 1130). At block 1124, if the KPI is between the lower bound and the upper bound (block 1124: in interquartile), process 1100 may calculate the base NPH score based on the CDF for the KPIs (block 1128).

In FIG. 12, lines 21-22 correspond to block 1126 of FIG. 11 and lines 23-24 correspond to block 1130, and lines 17-20 correspond to block 1128. Assume that the base NPH is denoted by Base.NPH(KPI, CATEGORY, NODE, TIME). Computing the NPH score entails calculating an AUC and a Perfect AUC (a normalization factor) of the CDF for the KPI. Given a series of KPI values, the CDF is first determined using well-known techniques. Then, the AUC is simply an area above the CDF, in the range between the particular KPI and the lower bound U (e.g., 2.5% threshold). The AUC can be expressed as:

$$AUC_{KPI\ CATEGORY\ NODE} = \sim_L^{KPI} CDF(KPI)d(KPI) \quad (7)$$

Figure 13B:
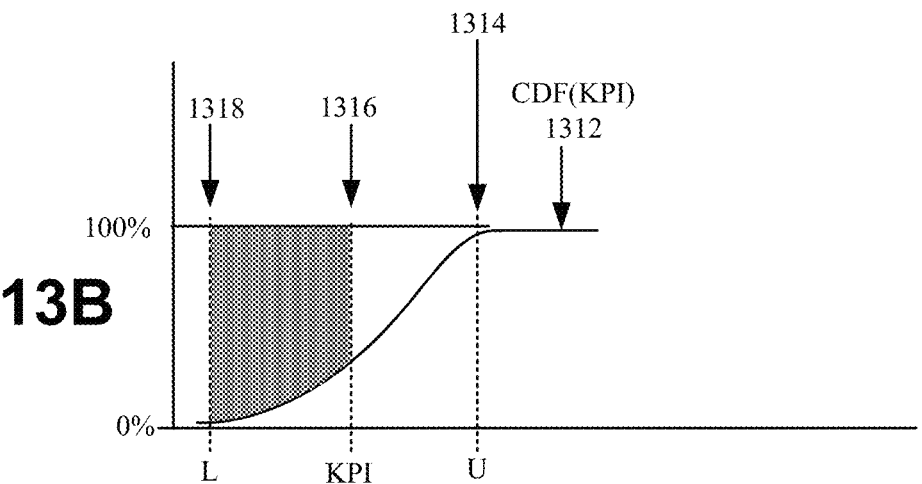

FIG. 13B illustrates the AUC, for a KPI classified as higher-is-better. In FIG. 13B, the AUC is the shaded area above 1312, ranging from KPI 1316 to L 1318. The perfect AUC is the area under the CDF, but ranging from the U to L. in accordance with expression (5). The base NPH score is still given by expression (6).

After performing actions in blocks 1114, 1116, 1118, 1126, 1128, or 1130, process 1100 may arrive at block 1140, where it returns to block 1106 to classify another KPI as lower-is-better or higher-is-better. Process 1100 may continue to perform actions in one or more of blocks 1118-1130 and 1140, until all of the KPIs in the particular category have been processed for calculating base NPH scores.

After the particular category of KPIs have been processed to generate the base NPH scores (for each KPI, CATEGORY, NODE, and TIME), the base NPH scores may be used to calculate correlation scores between the base NPH scores and mean opinion scores (MOSs) that relate to user network experience. In this step, coefficients for the base NPH are selected to maximize the correlation scores. The coefficients are updated through back propagation learning for a convolutional neural network (CNN1) (block 1142 and lines 26-28 in FIG. 12). Furthermore, $$\text{Base}.NPH(CATEGPORY, NODE, TIME) = \sum_{j=1} [Coeff_{Category(i)KPI(j)} \cdot \quad (8)$$

$$\text{Base}.NPH(KPI_j, CATEGORY, NODE, TIME)]$$

In expression (8), the summation is performed over the KPIs, and the resulting base NPH score is no longer dependent on KPIs. The TIME in expression (8) is 24 hours (daily). At block 1144, each coefficient (for each CATEGORY) is updated by applying back propagation learning to another convolutional neural network (CNN2) (see line 30 in FIG. 12). In addition, $$\text{Base}.NPH(NODE, TIME) = \quad (9)$$

$$\sum_{i=1} [Coeff_{Category(i)} \cdot \text{Base}.NPH(CATEGORY, NODE, TIME)]$$

In expression (9), the summation is performed over different categories, and the resulting base NPH score is no longer dependent on KPI categories. The time period for each base NPH score is 24 hours (daily).

Figure 14:
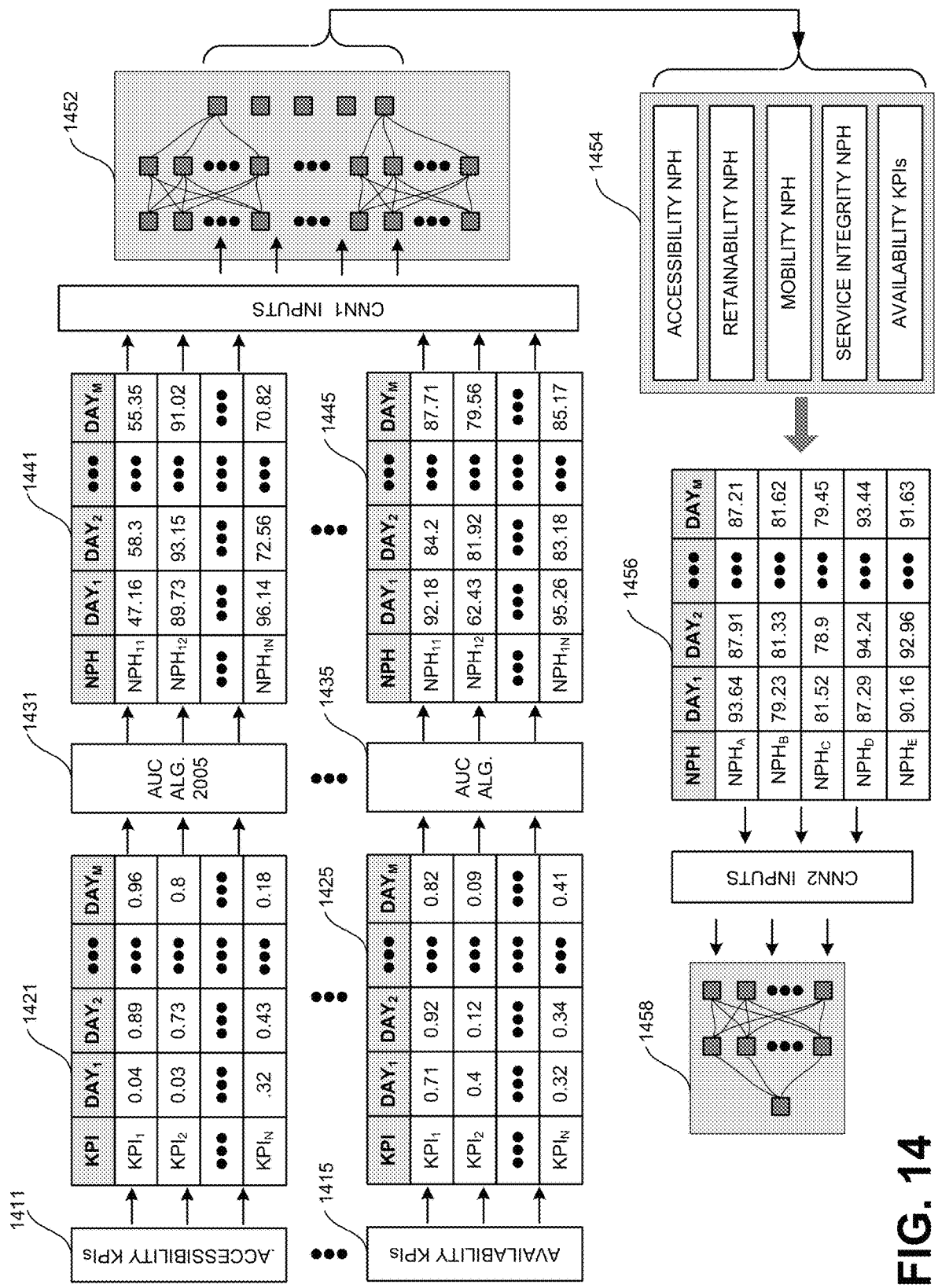
FIG. 14 depicts training exemplary convolutional neural networks (CNNs) in the process associated with FIG. 11 and FIG. 12.

FIGS. 11 and 12 illustrate blocks/actions that relate to convolutional neural networks. For example, at block 1142 and 1144 of FIG. 11 and lines 26-30, CNN1 and CNN2 are trained to obtain coefficients for determining base NPHs for each category and for the overall base NPH (which is derived by summing over the categories). The role of CNN1 and CNN2 in the context of determining Base.NPH(CATEGORY, NODE, TIME) and Base.NPH(NODE, TIME) is illustrated in FIG. 14. FIG. 14 depicts training CNN1 and CNN2 in the process associated with FIG. 11 and FIG. 12;

As shown in FIG. 14, different types of KPIs are used to generate NPHs. For example, FIG. 14 shows accessibility KPI 1411 and availability KPIs 1415 as inputs. Other types of KPI are also input, but not illustrated (e.g., retainability KPIs, mobility KPI's, service integrity KPIs). These input KPIs span a specific time interval, as shown by tables 1421 and 1425. For tables 1421 and 1425, each KPIs span M days. The KPIs are next used to calculate base NPHs in accordance with expressions (6) and (7), denoted by block 1431 . . . and 1435. Thus, the output of blocks 1431 . . . 1435 are daily base NPHs (for each KPI).

The output base NPH scores at blocks 1431 . . . 1435 are then correlated with MOS, to determine correlation coefficients. The correlation coefficients are selected to maximize the correlation between the base NPHs and MOS. Thereafter, the coefficients are updated in CNN1, via back propagation training (see block 1452), and then used to output base NPH scores, each per category (e.g., availability, accessibility, etc.) (1454 and 1456).

The resulting base NPH scores are next used as input to CNN2. In a manner similar to that described above, correlation coefficients are selected to maximize the correlation score between MOS and the NPHs. Next, CNN2 is trained via back propagation, so as to update the coefficients (block 1458). The output of CNN2 is the overall base NPH scores (over all the different categories).

Figure 15:
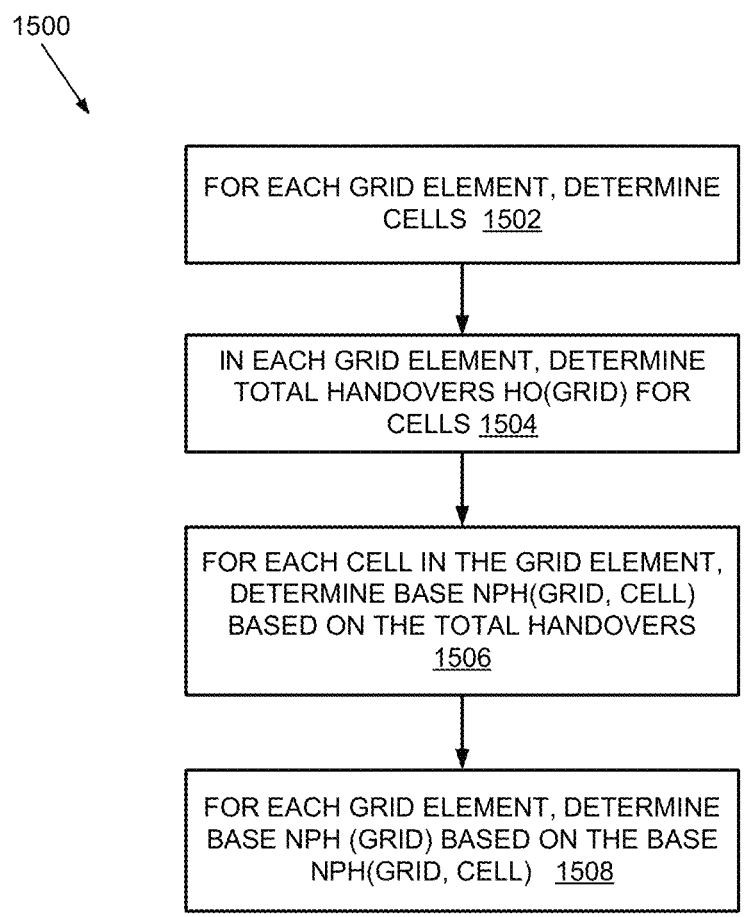
FIG. 15 is a flow diagram of a process for determining an exemplary base network performance health (NPH) score for an exemplary grid element.

FIG. 15 is a flow diagram of an exemplary process 1500 for determining an NPH score for a grid element. Because there is no KPI that pertains to a grid element, given a grid element, NPH scores must be calculated based on KPIs relating to network elements (e.g., cells). In one implementation, process 1500 may be performed by NPH monitor 412.

As shown, process 1500 may include, for a given grid element, identifying cells that overlap or intersect the grid element (block 1502). For each cell that overlaps or intersects the grid element, a handover count may be determined (block 1504).

Process 1500 may further include determining the base NPH for the selected grid element and the selected cell:

$$\text{Base.NPH(CELL, GRID, TIME)} = \text{Base.NPH(CELL, TIME)} \cdot \text{Handover}_{CELL\ GRID}/\text{Handover}_{GRID} \quad (10)$$

In expression (10), NPH(CELL, TIME) denotes the base NPH score for a selected node (which is a cell in this implementation) and a grid element intersecting with the cell. Base.NPH(CELL, TIME) denotes the daily base NPH score in accordance with expression (9). Handover$_{CELL\ GRID}$ denotes the number of handover for a selected cell and a grid element, and Handover$_{GRID}$ denotes the total number of handovers in the selected grid element. Essentially, the base NPH score for a selected cell and a selected grid element is found by normalizing the base NPH score from expression (9) to the ratio of cell handovers in the grid element to the total number of handovers in the grid element. Expression (10) may be evaluated for each cell intersecting with the selected grid element.

Process 1500 may also include summing the Base.NPH (CELL, GRID) over the cells intersecting with the grid element (block 1508). Summing the base NPH scores over the cells removes the dependent variable CELL, leaving the base NPH score that depends on the grid element.

Figure 16A:
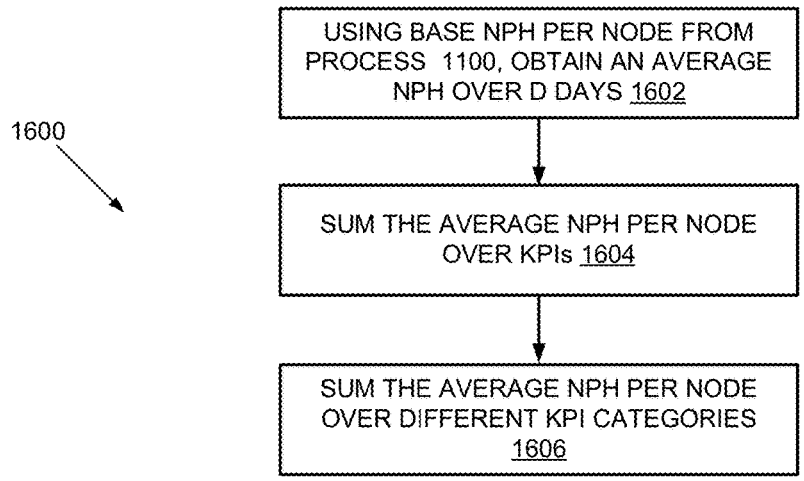
FIG. 16A is a flow diagram of a process for determining exemplary bi-weekly base NPH scores for network nodes in the network environment of FIG. 2.
Figure 17A:
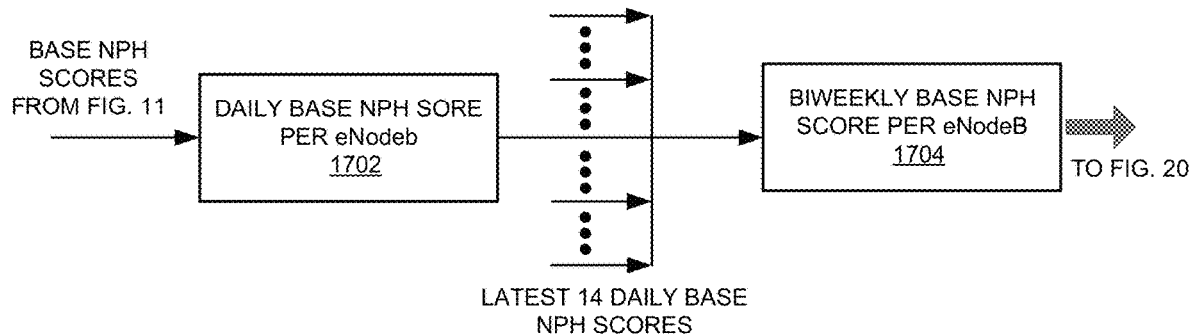
FIGS. 17A and 17B illustrate processing daily base NPH scores to obtain bi-weekly NPH scores for network nodes in accordance with the processes of FIG. 16A according to one implementation.
Figure 17B:
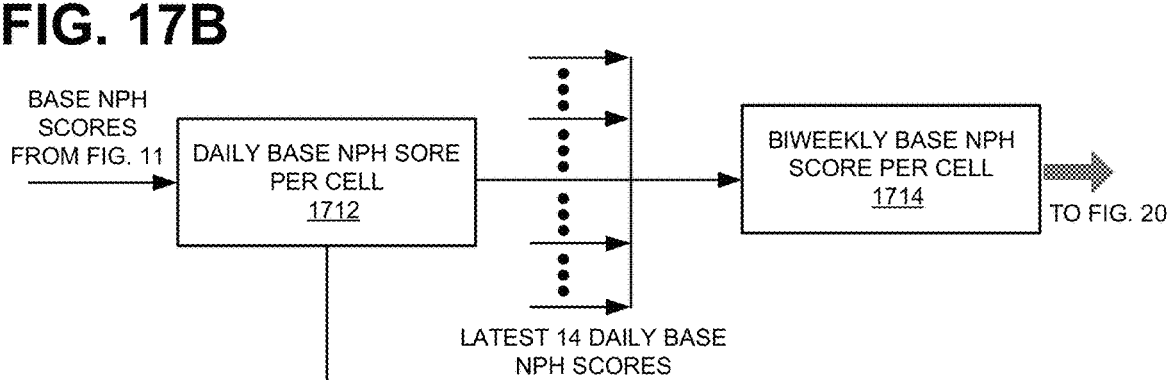

FIG. 16A illustrates an exemplary process 1600 for determining bi-weekly base NPH scores for network nodes. In some implementations, process 1600 may be performed by NPH monitor 412. FIGS. 17A and 17B illustrate processing daily base NPH scores to obtain bi-weekly NPH scores in accordance with process 1600. Although FIGS. 16A, 17A and 17B are based on obtaining NPH scores for the time interval of two weeks, in other implementations, the scores may be obtained for different time intervals (e.g., monthly NPH scores, yearly NPH scores, two-day NPH scores, weekly NPH scores, etc.).

As shown, process 1600 may include averaging the base NPH score computed from expression (6). That is, after base NPH scores are calculated for each KPI, each category of KPIs, and each node daily (i.e., Base.NPH(KPI, CATEGORY, NODE, DAILY)). The scores may be averaged over two weeks. As noted above, in other implementations, a different time interval (e.g., a month) may be selected. Accordingly, for process 1600, $$\text{Base.NPH(KPI, CATEGORY, NODE, BI-WEEKLY)} = \text{Two week average of Base.NPH(KPI, CATEGORY, NODE, DAILY)} \quad (11)$$

FIGS. 17A and 17B illustrate the averaging performed in expression (11), for eNodeBs and cells. In FIG. 17A, blocks 1702 and 1704 illustrate the averaging for eNodeBs. In FIG. 17B, blocks 1712 and 1714 illustrate the averaging for cells.

Process 1600 may further include summing the Base.NPH (KPI, CATEGORY, NODE, BI-WEEKLY) (obtained from expression (11) over different KPIs (block 1604), which yields Base.NPH(CATEGORY, NODE, BI-WEEKLY). To perform the sum, it is necessary to account for the coefficients previously provided in expression (8). That is, $$\text{Base.NPH(CATEGORY, NODE, BI-WEEKLY)} = \text{SUM(Base.NPH(KPI, CATEGORY, NODE, BI-WEEKLY)} \cdot \text{Coeff}_{CATORY\ KPI}) \quad (12)$$

The dependent variable KPI is removed from the base NPHs through expression (12). The base NPH scores resulting from expression (12) can then be summed over different categories, to finally obtain Base.NPH(NODE, BI-WEEKLY) (block 1606). Accordingly, $$\text{Base.NPH(NODE)} = \text{SUM(Base.NPH(CATEGORY, NODE, BI-WEEKLY)} \cdot \text{Coeff}_{CATEGORY}) \quad (13)$$

Figure 16B:
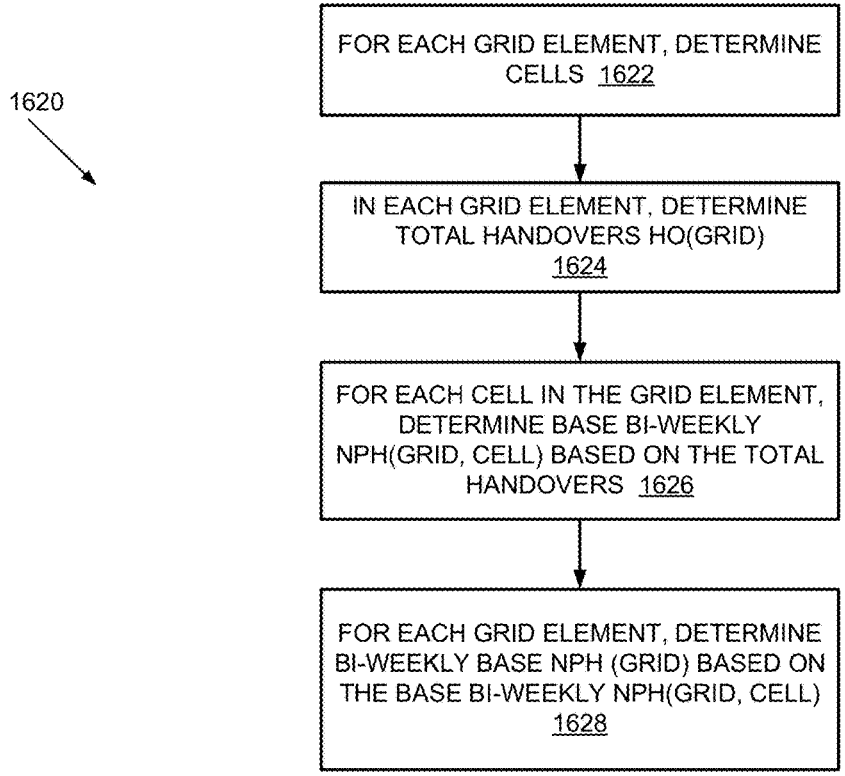
FIG. 16B is a flow diagram of a process for determining exemplary bi-weekly base NPH scores for exemplary grid elements for the network environment of FIG. 2.
Figure 17C:
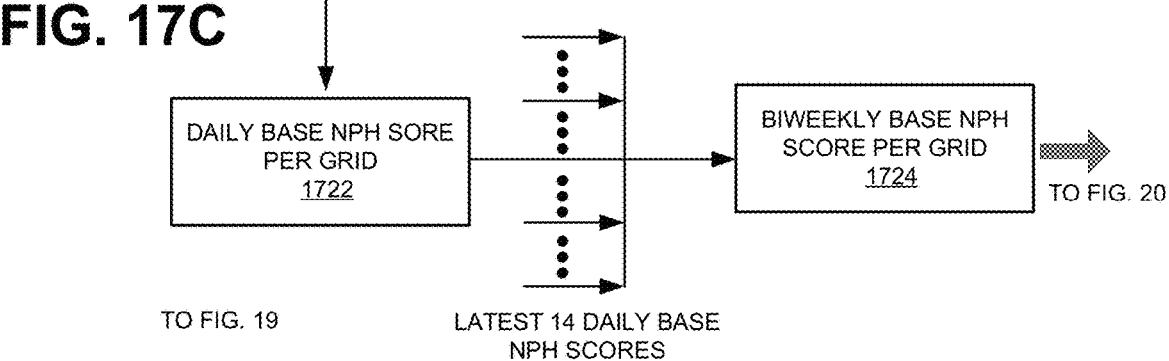
FIG. 17C illustrates processing daily base NPH scores to obtain bi-weekly NPH scores for grid elements in accordance with the processes of FIG. 16B according to one implementation.

FIG. 16B illustrates an exemplary process 1620 for determining bi-weekly base NPH scores for grid elements. In some implementations, process 1620 may be performed by NPH monitor 412. FIG. 17C illustrates processing daily base NPH scores to obtain bi-weekly NPH scores for grid elements in accordance with process 1620.

As shown, process 1620 may include, for a given grid element, determining cells that intersect with the grid element (block 1622), and determining the total number of handovers for the grid element (block 1624). The total number of handovers may be obtained from collected data on handovers for different cells.

Process 1620 may further include, for each cell in the grid element, determining bi-weekly base NPH scores based on the total number of handovers and the number of handovers per cell (block 1626). More specifically, for each cell intersecting with the grid element, process 1620 evaluates:

$$\text{Base.NPH(CELL, GRID)} = \text{Base.NPH(CELL, BI-WEEKLY)} \cdot \text{Handover(CELL, GRID)} / \text{Handover(GRID)} \quad (14)$$

Expression (14) is also illustrated in FIG. 17C. As shown, block 1722, which represents the base NPH score for each grid element, receives base NPH scores for cells, from block 1712.

After evaluating expression (14), process 1620 may determine the bi-weekly base NPH score for each grid element using the base NPH(CELL, GRID) obtained from expression (14) (block 1628). FIG. 17C illustrates the computation at block 1724. The result of expression (14) is then summed over the cells that intersect the particular grid element, to remove the dependence of the base NPH score on cells.

Figure 18:
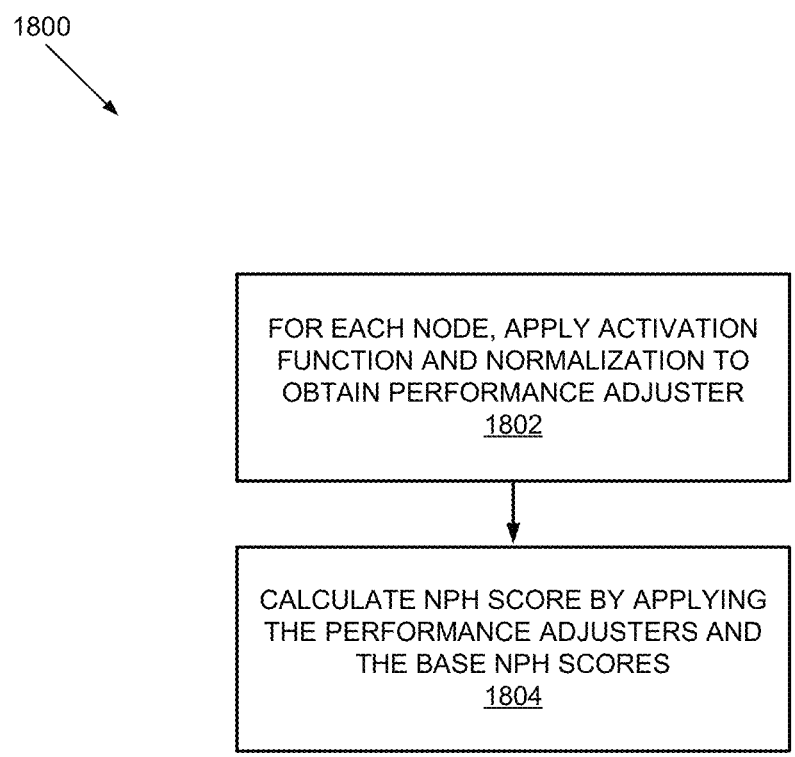
FIG. 18 is a flow diagram of a process for determining exemplary performance adjusters, final daily NPH scores, and final bi-weekly NPH scores for network nodes and grid elements in the network environment of FIG. 2.
Figure 19:
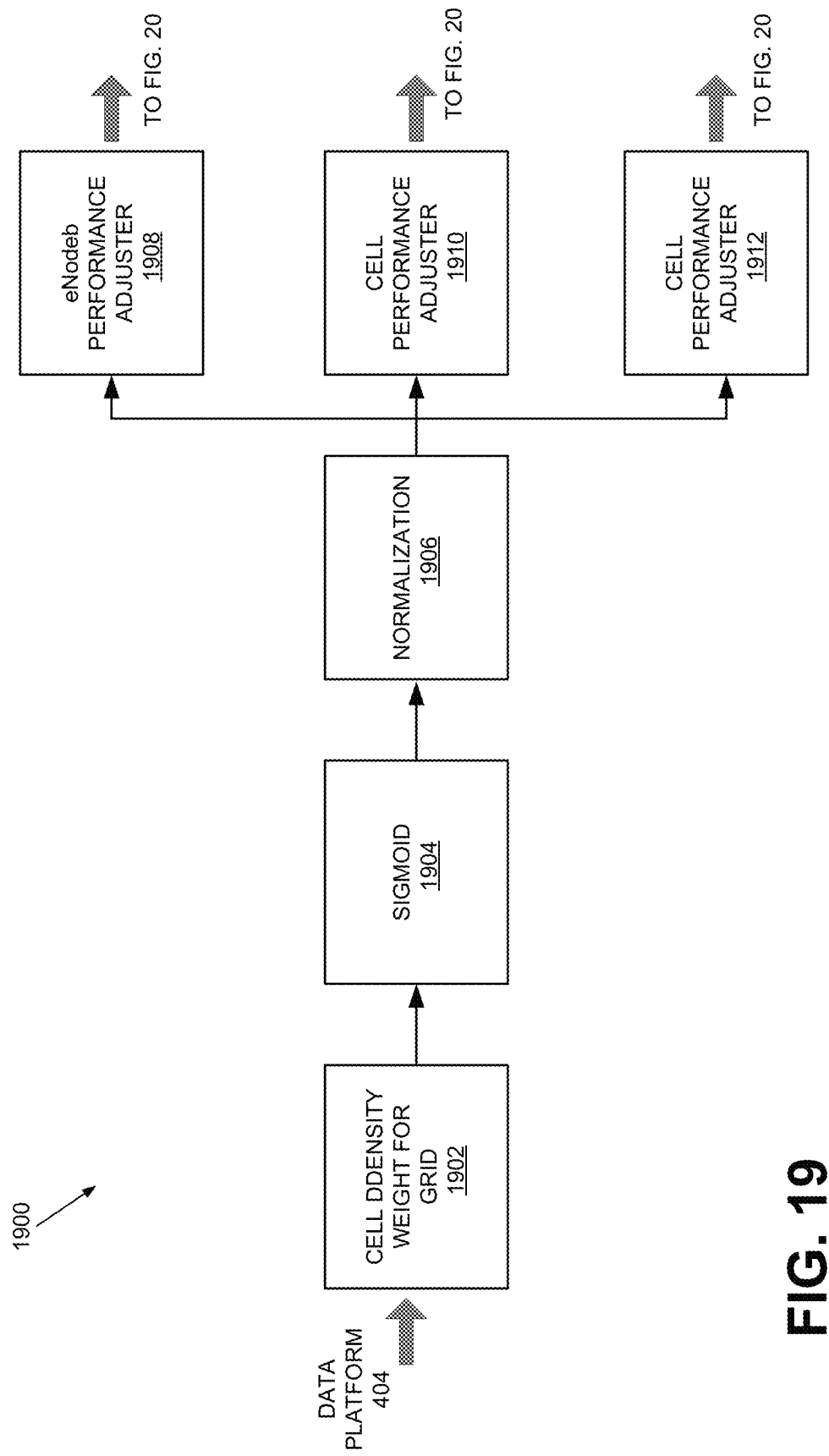
FIG. 19 illustrates processing that is associated with determining performance adjusters of FIG. 18.

FIG. 18 is a flow diagram of a process 1800 for determining final daily and bi-weekly NPH scores for nodes and grid elements using performance adjusters. FIG. 19 illustrates the processing of FIG. 18. In other implementations, the final NPH scores may be determined for time intervals other than two-weeks. Process 1800 may include, for each node (e.g., eNodeB, cell, etc.), applying an activation function and normalization to obtain a performance adjuster (block 1802).

For example, assume that an activation function is a sigmoid function, which is defined as $$\text{Sigmoid}(x) = (1+\exp(x))^{-1} \quad (15)$$

To obtain a performance adjuster for a grid element, first define $\text{TARGET}_{MAX}=1$, $\text{TARGET}_{MIN}=\frac{1}{2}$, $B1=2$, $B2=5$, and $B3=3$. Then assign the activity level (activation) of each grid element as a sigmoid function of these variables:

$$\text{Sigmoid(GRID)} = \text{Sigmoid (SUM}(B1, B2 \ldots) \cdot (B1 \cdot \text{SCORE}_{RSRP\ GRID} + B2 \cdot \text{SCORE}_{SINR\ GRID} + B3\ \text{SCORE}_{HO\ GRID})/2) \quad (16)$$

In expression (16), $\text{SCORE}_{RSRP\ GRID}$, $\text{SCORE}_{SINR\ GRID}$ and $\text{SCORE}_{HO\ GRID}$ denote: a reference signal received power score; a signal-to-interference-plus-noise ratio score; and a handover score. These scores are obtained from different components in data collection system 402. FIG. 19 illustrates evaluating expression (16) as blocks 1902 (determining cell density weight) and block 1904 (applying the calculated cell density weight to a sigmoid function).

According to expression (16), the sigmoid function can attain different values. Let $\text{Sigmoid}_{MAX}$ and $\text{Sigmoid}_{MIN}$ be the maximum and the minimum of these values. Then, an NPH score can be rescaled from the range [$\text{Sigmoid}_{MIN}$, $\text{Sigmoid}_{MAX}$] to the range [$\text{TARGET}_{MIN}$, $\text{TARGET}_{MAX}$], by multiplying by the following factor:

$$\text{PA(GRID)} = [\text{Sigmoid(GRID)} - \text{Sigmoid}_{MIN}]/[\text{Sigmoid}_{MAX} - \text{Sigmoid}_{MIN}] \cdot [\text{TARGET}_{MAX} - \text{TARGET}_{MIN}] + \text{TARGET}_{MIN} \quad (17)$$

In expression (17), the rescaling factor is the PA (performance adjuster), which is also illustrated by block 1906 (normalization) and blocks 1912 (performance adjusters for grid elements) in FIG. 19. Once PAs are obtained based on expression (17), the PAs may be used to compute final NPH scores (block 1804). The computation may be performed in accordance with the following expression:

$$\text{FINAL NPH(GRID, TIME)} = \text{Base.NPH(GRID, TIME)} \cdot \text{PA(GRID)} \quad (18)$$

For different network elements (e.g., cell or eNodeB), performance adjusters can be obtained in a manner similar to that described above for each grid element. FIG. 19 illustrates computing performance adjusters for cells and eNodeBs at blocks 1910 and 1912. For each node, $$\text{FINAL NPH(NODE, TIME)} = \text{Base.NPH(NODE, TIME)} \cdot \text{PA(NODE)} \quad (19)$$

In one implementation, expressions (18) and (19) are evaluated for TIME set to DAILY or BI-WEEKLY. In other implementations, different time periods may be used.

Various NPH scores (e.g., those in expressions (8)-(14), (18), and (19)) relate to healthiness of different aspects of a given network. Furthermore, some of the above NPH scores relate to user QoE (e.g., expression (8) and (9)). As explained above, a given set of NPH scores may pertain to a particular technology. For example, in one implementation, NPH scores are derived for LTE or Voice-over-LTE (VoLTE).

FIG. 20 illustrates exemplary final NPH scores and final bi-weekly NPH scores for different types of nodes as tables. In one implementation, each score in tables 2002-2012 may be determined by NPH monitor 412 and stored in data visualization and automation 408 (e.g., network reconfiguration system 414). Tables 2002-2006 illustrate the daily scores for grid elements, eNodeBs, and cells, respectively, and tables 1908-1912 illustrate bi-weekly scores for grid elements, eNodeBs, and cells, respectively. Each table may include six types of NPH scores for LTE and VoLTE: overall NPH, accessibility NPH, retainability NPH, service integrity NPH, availability NPH, and mobility NPH. To obtain these NPH scores, for each technology (i.e., LTE and VoLTE), NPH monitor 412 may apply the results of process 1100 (daily base NPH scores for eNodeB and cells), process 1500 (daily base NPH scores for grid elements), processes 1600 and 1620 (bi-weekly base NPH scores), and process 1800 (obtaining and applying performance adjusters).

Figure 21:
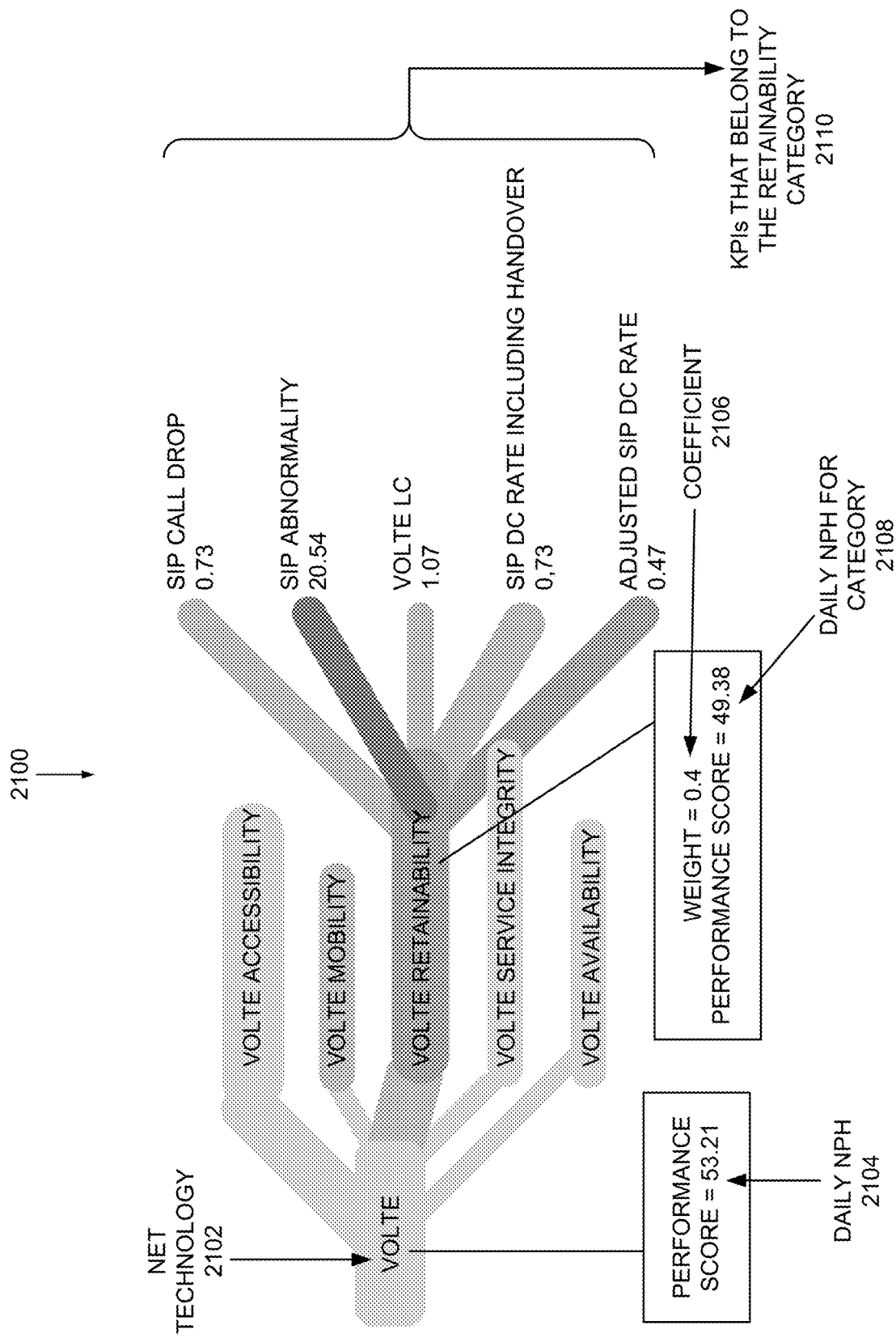
FIG. 21 illustrates an exemplary decision tree that is associated with NPH scores.

FIG. 21 illustrates an exemplary decision tree that is associated with NPH scores. In one implementation, decision tree 2100 may be provided to users of NPO system 212 via data visualization and automation system 408. As shown in FIG. 21, the first component of decision tree 2100 is the network technology. In tree 2100, NET technology 2102 indicates that the particular technology that tree 2100 addresses is VoLTE. For VoLTE, daily NPH 2104 is shown as performance score of 53.21.

Tree 2100 branches into various categories associated with the technology, such as accessibility, mobility, retainability, service integrity, and availability. In FIG. 21, the degree to which each branch contributes to the overall score (i.e., weight) is indicated by its thickness. For example, in FIG. 21, the branches to the VoLTE accessibility and the VoLTE retainability are thicker than those connected to other categories, indicating their relative contribution to the overall NPH score at NET technology level 2102.

Each of the branches to the five subcategories can be selected via a user interface. In FIG. 21, the VoLTE retainability is selected, and hence, its NPH score 2108 is shown (i.e., NPH(CATEGORY, DAILY)), along with the weight of 0.4 associated with the branch. The selection of VoLTE retainability also leads to display of its sub-branches to individual KPIs that contribute to the overall VoLTE retainability NPH score. In FIG. 21, five such values are illustrated (e.g., SIP call drop, SIP abnormality, VOLTE LTE, etc.).

In tree 2100, various branches are shaded differently to indicate the extent to which the NPH score can be considered "good" or "bad." For example, a darker color may indicate greater negative impact of each score to the overall NPH score. For example, the branch from VoLTE retainability to SIP_ABNORMALITY is shaded darker than other branches, to indicate the negative impact of the KPI to the VoLTE retainability NPH score. In other implementations, different color scheme may be used to indicate the impact of each scores of the braches (e.g., a red or green color gradient indicating a negative or positive impact).

Figure 22:
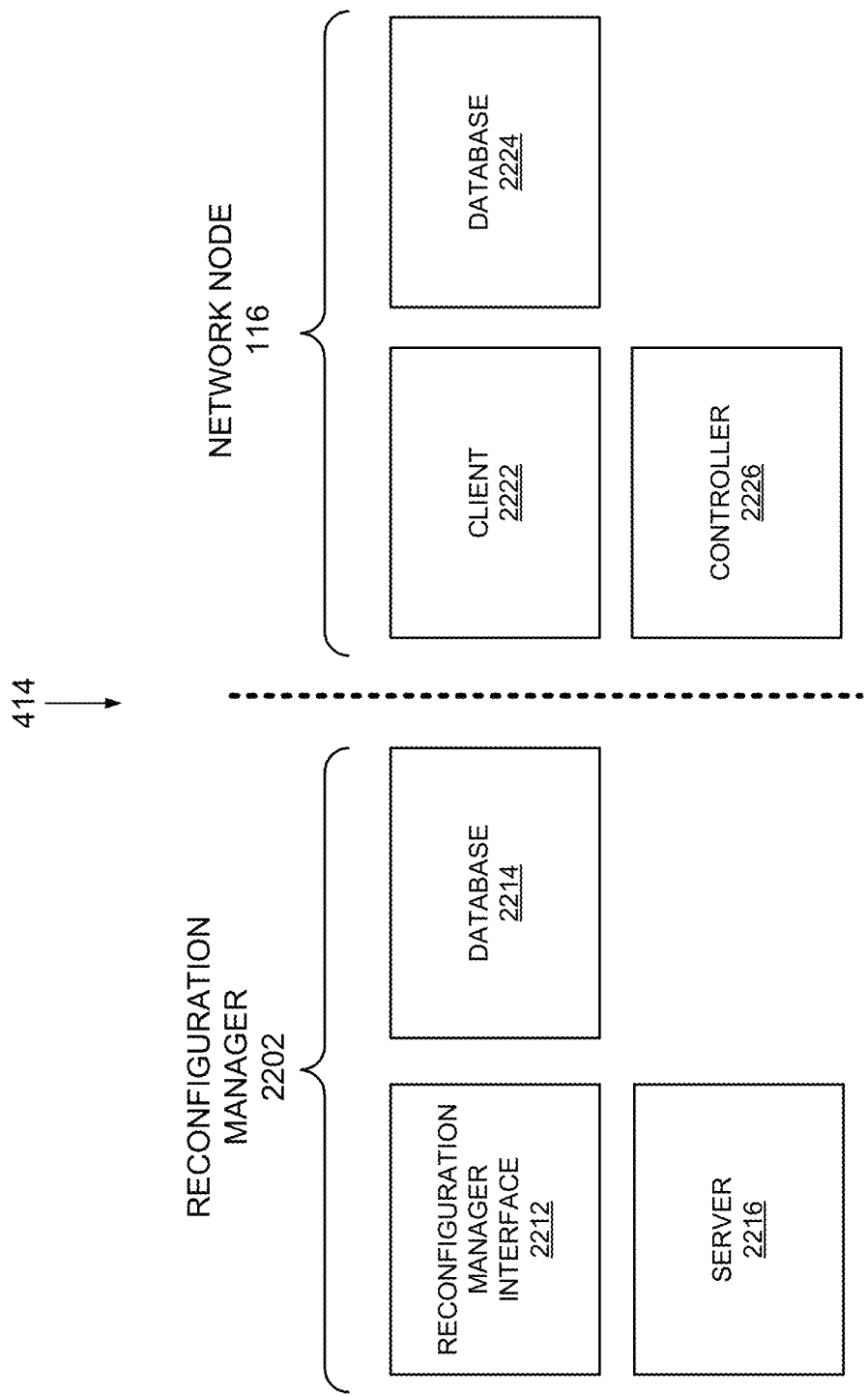
FIG. 22 is a block diagram of exemplary functional components of the network reconfiguration system of FIG. 1C and FIG. 4.

FIG. 22 illustrates an exemplary network reconfiguration system 414 in a network. As shown, network reconfiguration system 414 may include a reconfiguration manager 2202 and one or more network node(s) 116. In some implementations, reconfiguration system 414 may include relatively few reconfiguration managers and many network nodes. In other implementations, system 414 may include distributed configuration managers 2202 over multiple devices/platforms. In still other implementations, all the functionalities of reconfiguration manager 2202 may be included in components installed in network nodes 116. Reconfiguration manager 2202 may receive data from intelligent anomaly detector 410 and NPH monitor 412 and issue commands/data to network node 116. Network node 116 receives commands/data from reconfiguration manager 2202 and controls network components in accordance with the commands/data.

As shown, reconfiguration manager 2202 may include a reconfiguration manager interface 2212, a database 2214, and a server 2216. Reconfiguration manager interface 2212 acts as a gateway between manager 2202 and other network entities, such as intelligent anomaly detector 410, NPH monitor 412, administrator devices, user devices, etc. For example, reconfiguration manager interface 2212 may receive information regarding anomalies from intelligent anomaly detector 410 and NPH scores from NPH monitor 412. In addition, interface 2212 may receive control commands from operator/user devices (e.g., via web interface), access information, and provide information to user devices. When interface 2212 receives information from external network entities, interface 2212 may store the information in database 2214.

Database 2214 may store data on detected and predicted anomalies, NPH scores, control settings, and/or other information received through interface 2212. Database 2214 may also retrieve and/or modify such data in response to user commands. In some implementations, database 2214 may also store rules for modifying network device parameters based on the predicted/detected anomalies and NPH scores.

Server 2216 may determine appropriate actions for network nodes 116 based on predicted or detected anomalies and NPH scores, and dispatch commands to network nodes 116. In some implementations, the actions may be determined based on programmed procedures. In other implementations, server 2216 may retrieve relevant rules from database 2214 and apply the rules to data on anomalies and/or NPH scores. Server 2216 may record the results of issuing the commands in database 2214, as well as the commands themselves.

For example, when server 2216 determines that there is likely to be a network anomaly in specific cells, server 2216 may obtain rules regarding anomalies detected or predicted for cell traffic. If the rule indicates that the traffic problem can be eliminated by load-balancing the traffic between two cells, server 2216 may issue commands to specific network nodes 116 (e.g., to direct handoffs).

As also shown, network node 116 may include a client 2222, a local database 2224, and a controller 2226. Client 2222 may receive commands and/or data from server 2216, and store the received information in local database 2224. Database 2224 may store local copies of received data/commands through client 2222. In some implementations, database 2224 may also store readings (e.g., device parameters) collected locally. For example, if network node 116 is implemented as a router, database 2224 may collect traffic data and/or related statistics.

Controller 2226 may modify engineering parameters for network components and/or devices at node 116 in response to the received data and/or commands at client 2222. For example, according to one implementation in which network node 116 is implemented as a base station, controller 2226 may receive a command to modify direction of the antenna. In other implementations (e.g., in network components other than base station, such as a router, serving gateway, etc.), controller 2226 may adjust other types of network performance/operating parameters, such as load balancing parameter, memory utilization parameter, bandwidth allocation based on traffic type, antenna related parameters, routing paths, etc.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 10, 11, 15, 16A, 16B, and 18, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
   a communication interface;
   memory to store instructions;
   one or more processors to:
      collect, from a wireless network and through the communication interface, first data pertaining to device nodes in the wireless network, wherein each datum of the first data belongs to one of two or more categories;
      perform, for each of the device nodes, for each of the categories, for each datum belonging to the category:
         determine if the datum is inside of a first range of values; and
         if the datum is inside the first range, calculate a first base Network Performance Health (NPH) score as a function of the device nodes, the categories, the data, and time;
      apply first deep learning to a first neural network among a plurality of neural networks to update first coefficients for correlating the first base NPH score to a mean opinion score, for each of the categories;
      obtain a second base NPH score as a function of the device nodes, the categories, and time by using the first coefficients, wherein the second base NPH score indicates user Quality of Experience (QoE) with the wireless network;
      for at least one of the device nodes and time, obtain a value of an operating parameter of the at least one of the device nodes based on one or more scores, among the first NPH scores and the second NPH scores; and
      send, through the communication interface, the value of the operating parameter to the at least one of the device nodes;
   wherein the at least one of the device nodes is to:
      receive the value from the device, and
      set the operating parameter to the received value to optimize operation of the wireless network.

2. The device of claim 1, wherein the first data includes a series of key performance indicator values.

3. The device of claim 1, wherein the categories include at least two of:
   service availability, service integrity, service accessibility, mobility, or retainability.

4. The device of claim 1, wherein the device nodes include at least one or more of eNodeB or cell.

5. The device of claim 1, wherein when the one or more processors determine if the datum is inside of the first range, the one or more processors:
   determine if the datum is within a range where at least 50% of the data is found.

6. The device of claim 1, wherein the one or more processors are further to:
   if it is determined that the datum is outside the first range, set the first base NPH score to be equal to either 0% or 100%.

7. The device of claim 1, wherein the plurality of neural networks include convolutional neural networks.

8. The device of claim 1, wherein the one or more processors are further to:
   apply second deep learning to a second neural network among the plurality of neural networks to update second coefficients, for each of the categories; and
   use the second coefficients and the second base NPH score to generate a third base NPH score that is a function of the device nodes and time.

9. The device of claim 1, wherein the time indicates a time interval for which the first NPH score applies, and wherein the time interval is about one hour to 24 hours.

10. The device of claim 1, wherein when the one or more processors calculate the first base NPH score, the one or more processors:
    determine a cumulative distribution function (CDF) for the first data;
    obtain an area under a curve for the CDF over a first range; and
    normalize the area under the curve by dividing the area under the curve by an area under the curve of the CDF computed over a second range.

11. The device of claim 1, wherein when the one or more processors determine if the datum is inside the first range, the one or more processors:
    determine whether increasing a value of the datum improves performance of the wireless network or decreasing the value of the datum improves performance of the wireless network.

12. The device of claim 1, wherein the one or more processors are further to:
    determine a third base NPH score for a geographical area based on base NPH scores that are functions of the device nodes, the categories, the data, and time.

13. The device of claim 12, wherein when the one or more processors determine the third base NPH score, the one or more processors:
    determine a set of nodes, among the device nodes, that intersect the geographical area, and
    sum normalized values of the base NPH scores over the intersecting nodes to obtain the third base NPH score.

14. The device of claim 13, wherein each of the normalized values of the base NPH scores is a product of handover counts and a base NPH score as a function of the device nodes.

15. A device comprising:
    a communication interface;
    memory to store instructions; and
    one or more processors to:
       obtain first data from device nodes of a wireless network;

filter the first data to remove second data having extreme values from the first data;
determine whether the filtered data is white noise;
if the filtered data is not white noise, apply a learning anomaly detection to predict an anomaly or detect an anomaly in the first data, wherein the learning anomaly detection includes forming a linear combination of results from:
  decomposing the first data into a trend component, seasonal component, and noise component;
  applying a seasonal autoregressive integrated moving average model to the first data; and
  applying a seasonal autoregressive model after removing a trend component and a seasonal component from the first data;
for the detected or predicted anomaly, obtain a value of an operating parameter of one of the device nodes of the wireless network, and
send, over the communication interface, the value of the operating parameter to the one of the device nodes in the wireless network,
wherein the one of the device nodes is to:
  receive the value of the operating parameter; and
  set the operating parameter to the received value to eliminate the potential or detected anomaly in the wireless network.

16. The device of claim 15, wherein the first data includes a series of key performance indicator values.

17. The device of claim 15, wherein when the one or more processors determine whether the first data is white noise, the one or more processors:
  apply Ljung-Box test to determine whether there is a relationship between any two items among the first data.

18. The device of claim 15, wherein when the one or more processors form the linear combination, the one or more processors:
  determine coefficients used for forming the linear combination, wherein, to determine the coefficients, the one or more processors determine numerical values that yield a east-squares error between the first data and the prediction values.

19. The device of claim 15, wherein when the one or more processors filter the first data, the one or more processors:
  determine an interquartile range into which 50% of the first data fall.

20. The device of claim 15, wherein the one or more processors are further to:
  determine an upper bound from the first data; and
  when one of the prediction values exceeds the upper bound, indicate the detected anomaly.

* * * * *